(12) United States Patent
Semturs et al.

(10) Patent No.: US 10,198,491 B1
(45) Date of Patent: Feb. 5, 2019

(54) COMPUTERIZED SYSTEMS AND METHODS FOR EXTRACTING AND STORING INFORMATION REGARDING ENTITIES

(71) Applicant: Google Inc., Mountain View, CA (US)

(72) Inventors: Christopher Semturs, Ottenbach (CH); Lode Vandevenne, Zürich (CH); Danila Sinopalnikov, Adliswil (CH); Alexander Lyashuk, Adliswil (CH); Sebastian Steiger, Zürich (CH); Henrik Grimm, Zürich (CH); Nathanael Martin Schärli, Lotzwil (CH); David Lecomte, Zürich (CH)

(73) Assignee: GOOGLE LLC, Mountain View, CA (US)

( * ) Notice: Subject to any disclaimer, the term of this patent is extended or adjusted under 35 U.S.C. 154(b) by 650 days.

(21) Appl. No.: 14/792,519

(22) Filed: Jul. 6, 2015

(51) Int. Cl.
*G06F 17/00* (2006.01)
*G06F 17/30* (2006.01)

(52) U.S. Cl.
CPC .. *G06F 17/30563* (2013.01); *G06F 17/30011* (2013.01); *G06F 17/3053* (2013.01); *G06F 17/30864* (2013.01)

(58) Field of Classification Search
CPC .............................................. G06F 17/30563
See application file for complete search history.

(56) References Cited

U.S. PATENT DOCUMENTS

| 7,970,766 | B1 | 6/2011 | Shamsi et al. | |
|---|---|---|---|---|
| 8,000,956 | B2 | 8/2011 | Brun et al. | |
| 9,639,827 | B1 * | 5/2017 | Li | G06Q 10/1053 |
| 2009/0012842 | A1 | 1/2009 | Srinivasan et al. | |
| 2011/0231347 | A1 | 9/2011 | Xu et al. | |
| 2013/0031090 | A1 * | 1/2013 | Posse | G06F 17/30867 707/723 |
| 2013/0132381 | A1 | 5/2013 | Chakrabarti et al. | |
| 2013/0325881 | A1 | 12/2013 | Deshpande et al. | |
| 2014/0108322 | A1 | 4/2014 | Buchanan et al. | |
| 2014/0214822 | A1 * | 7/2014 | Sinha | G06F 17/3053 707/731 |
| 2014/0337306 | A1 | 11/2014 | Gramatica | |
| 2015/0006512 | A1 | 1/2015 | Alfonseca et al. | |
| 2015/0039406 | A1 * | 2/2015 | Dubey | G06Q 30/0242 705/14.4 |
| 2015/0227891 | A1 * | 8/2015 | Cohen | G06Q 10/1053 705/321 |

* cited by examiner

*Primary Examiner* — Cheryl Lewis
(74) *Attorney, Agent, or Firm* — Middleton Reutlinger

(57) ABSTRACT

Computer-implemented systems and methods are provided for extracting and storing information regarding entities from documents, such as webpages. In one implementation, a system is provided that detects an entity candidate in a document and determines that the detected candidate is a new entity. The system also detects a known entity proximate to the known entity based on the one or more entity models. The system also detects a context proximate to the new and known entities having a lexical relationship to the known entity. The system also determines a second entity class associated with the known entity and a context class associated with the context. The system also generates a first entity class based on the second entity class and the context class. The system also generates an entry in the one or more entity models reflecting an association between the new entity and the first entity class.

18 Claims, 13 Drawing Sheets

COMPUTERIZED SYSTEMS AND METHODS FOR EXTRACTING AND STORING INFORMATION REGARDING ENTITIES

BACKGROUND

The present disclosure generally relates to knowledge bases and computerized systems and methods for extracting and storing information regarding entities. More particularly, and without limitation, the disclosed embodiments relate to computerized systems and methods for extracting and storing information regarding entities from electronic documents available over a network, such as the Internet.

Documents exist in various forms and contain troves of information. In the computer age, electronic documents are continually generated and publicly available over the Internet and other sources. Examples of electronic documents include webpages, articles, press releases, news items, technical papers, and the like. Such documents may be indexed by a search engine and stored in one or more databases to enable electronic access and retrieval of information by users.

Electronic documents may provide information on a wide variety of topics, as well as persons, places, and things. For example, such documents may refer to products, sports stars, songs, and books. Many users may wish to search for and review information from documents, including information regarding entities. Conventional knowledge bases, however, can fail to provide up-to-date or reliable information regarding entities and other information desired by users.

SUMMARY

The disclosed embodiments include computer-implemented systems and methods for extracting and storing information regarding entities. The disclosed embodiments may provide systems and methods for determining classes and attributes of new entities, as well as association scores reflecting degrees of relatedness and levels of confidence in the determined relationships. The disclosed embodiments may determine these classes, attributes, and related scores based on surrounding lexical contexts in which the new entities appear and known entities proximate to each new entity. Aspects of the disclosed embodiments also provide systems and methods for dynamically updating and storing determined relationships in real-time or near real-time.

The disclosed embodiments include, for example, a system for extracting and storing information regarding entities from documents, such as webpages. The system includes a memory device that stores a set of instructions and one or more processors configured to execute the set of instructions to perform one or more operations. The operations include detecting an entity candidate in a document accessible over a network. The operations also include determining that the detected entity candidate is a new entity based on one or more entity models stored in a database. The operations also include detecting a known entity proximate to the new entity, wherein the known entity is contained in the one or more entity models. The operations also include detecting a context proximate to the new entity and the known entity, wherein the context has a lexical relationship to the known entity. The operations also include determining a second entity class associated with the known entity and a context class associated with the context. The operations also include generating a first entity class associated with the new entity based on the second entity class and the context class. The operations also include generating, in the database, a first entry in at least one of the one or more entity models, the entry reflecting the association between the first entity class and the new entity.

The disclosed embodiments also include, for example, a computer-implemented method for extracting and storing information regarding entities, wherein the method comprises operations performed on one or more processors. The method includes, for example, detecting an entity candidate in a document accessible over a network. The method also includes determining that the detected entity candidate is a new entity based on one or more entity models stored in a database. The method also includes detecting a known entity proximate to the new entity, wherein the known entity is contained in the one or more entity models. The method also includes detecting a context proximate to the new entity and the known entity, wherein the context has a lexical relationship to the known entity. The method also includes determining a second entity class associated with the known entity and a context class associated with the context. The method also includes generating a first entity class associated with the new entity based on the second entity class and the context class. The method also includes generating, in the database, a first entry in at least one of the one or more entity models, the entry reflecting the association between the first entity class and the new entity.

The disclosed embodiments also include, for example, a tangible, non-transitory computer-readable medium storing instructions, that, when executed by at least one processor, cause the at least one processor to perform a method for extracting and storing information regarding entities. The method includes detecting an entity candidate in a document accessible over a network. The method also includes determining the detected entity candidate is a new entity based on one or more entity models stored in a database. The method also includes detecting a known entity proximate to the new entity, wherein the known entity is contained in the one or more entity models. The method also includes detecting a context proximate to the new entity and the known entity, wherein the context has a lexical relationship to the known entity. The method also includes determining a second entity class associated with the known entity and a context class associated with the context. The method also includes generating a first entity class associated with the new entity based on the second entity class and the context class. The method also includes generating, in the database, a first entry in at least one of the one or more entity models, the entry reflecting the association between the first entity class and the new entity.

Additional features and advantages of the disclosed embodiments will be set forth in part in the description that follows, and in part will be obvious from the description, or may be learned by practice of the disclosed embodiments. The features and advantages of the disclosed embodiments will be realized and attained by means of the elements and combinations particularly pointed out in the appended claims.

It is to be understood that both the foregoing general description and the following detailed description are examples and explanatory only and are not restrictive of the disclosed embodiments as claimed.

The accompanying drawings constitute a part of this specification. The drawings illustrate several embodiments of the present disclosure and, together with the description, serve to explain the principles of the disclosed embodiments as set forth in the accompanying claims.

DETAILED DESCRIPTION OF THE EXAMPLE EMBODIMENTS

The disclosed embodiments relate to systems and methods for extracting and storing information regarding entities from documents, such as webpages. The identified information may be stored in a knowledge base, such as that used by a search engine. The disclosed embodiments include computer-implemented systems and methods for determining classes and properties of entities, and updating their attributes over time. In some aspects, the disclosed embodiments may recognize new entities and assign them attributes and class values. These classes and attributes may be determined from the surrounding lexical context(s) in which the new entities appear, attributes and entity classes of known entities proximate to them, and other factors. These determinations may be made based on association scores corresponding the identified contexts and proximate known entities. In some embodiments, the system may crawl over several network-based documents (e.g., webpages, etc), enabling the system to update and modify assigned classes and attributes over time with the analysis of additional documents and as association scores change in time. The disclosed embodiments may also store the new, identified relationships and attributes in entity databases, and provide access to such entity databases to a search engine to facilitate search queries from users.

Identifying entities over computer networks and determining their class types and attributes may provide one or more technical advantages and improvements. For example, it may prove advantageous to maintain indexed, up-to-date database structures to provide users with current, relevant search results in response to their queries. This advantage may be particularly pertinent with respect to newly discovered entities and relationships in light of trending, recently released, and viral phenomena. Furthermore, it may prove advantageous to maintain updated knowledge databases to improve the reliability, speed, and efficacy of responding to search queries and information requests by users.

Reference will now be made in detail to embodiments of the present disclosure, examples of which are illustrated in the accompanying drawings. Where possible, the same reference numbers will be used throughout the drawings to refer to the same or like parts.

Figure 1:
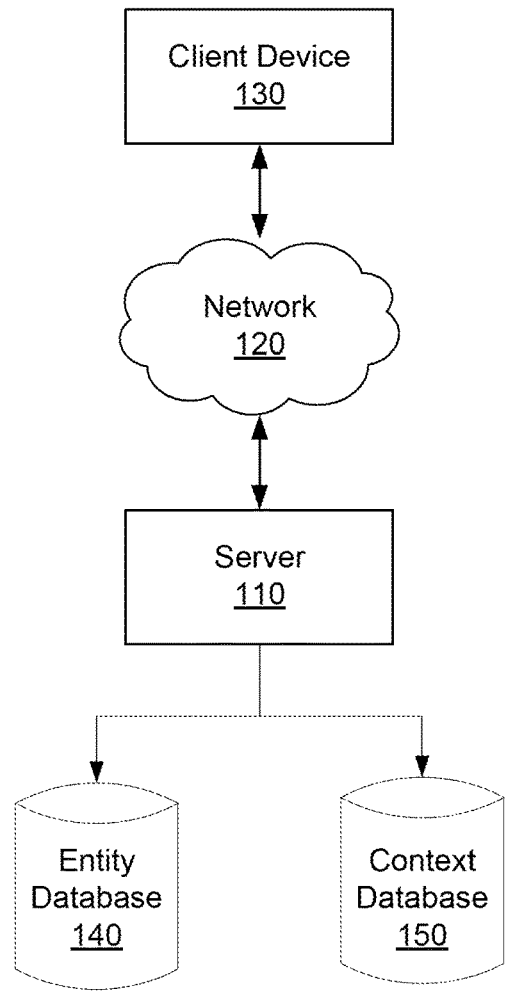
FIG. 1 depicts an example system environment for implementing embodiments consistent with the disclosed embodiments.

FIG. 1 depicts an example system environment 100 for implementing systems and methods consistent with the disclosed embodiments. In some aspects, system environment 100 may include one or more client devices (e.g., client device 130), which may be associated with respective one or more users (not shown), one or more servers (e.g., server 110), which may be associated with one or more knowledge hosts, one or more entity databases (e.g., entity database 140), one or more context databases (e.g., context database 150), and one or more networks 120 connecting one or more of the components of system environment 100.

In some aspects, client device 130 may include any computing or data processing device consistent with the disclosed embodiments. For example, client device 130 may include a personal computer, a laptop computer, a tablet computer, a notebook computer, a hand-held computer, a personal digital assistant, a portable navigation device, a mobile phone, a wearable device, an embedded device, a smartphone, and any additional or alternate computing device. In some embodiments, client device 130 may be implemented with hardware devices and/or software applications running thereon. In certain aspects, client device 130 may be operable to transmit and receive data across a communications network (e.g., network 120). In some aspects, client device 130 may implement aspects of the disclosed embodiments without accessing other devices or networks, such as network 120 or server 110. Client device 130 may be implemented with one or more processors or computer-based systems, such as the computing system 1000 of FIG. 10. In certain aspects, client device 130 may include one or more client devices.

In certain aspects, client device 130 may be associated with one or more users. In one example, a user may use client device 130 to perform one or more processes consistent with the disclosed embodiments (see, e.g., the embodiments described with reference to FIGS. 1-10). For example, a user may use client device 130 to input information, receive information, and transmit information to and from other components in system environment 100, such as server 110. Such information may comprise any data consistent with the disclosed embodiments.

System environment 100 may include one or more networks 120. In some aspects, network 120 may represent any type of communication network or medium of digital communication for transmitting information between computing devices. For example, network 120 may include a LAN, a wireless LAN, a cellular network, an RF network, a Near Field Communication (NFC) network (e.g., a WiFi network), a wireless Metropolitan Area Network (MAN) connecting multiple wireless LANs, NFC communication link(s), any physical wired connection (e.g., via an I/O port), and a WAN (e.g., the Internet). In some embodiments, network 120 may be secured through physical encryption (e.g., line encryption), by requiring information to be encrypted on other computer systems (e.g., end encryption), and the like.

In certain aspects, network 120 may include any accessible network or networks interconnected via one or more communication protocols, including hypertext transfer protocol (HTTP) and transmission control protocol/internet protocol (TCP/IP). Communications protocols consistent with the disclosed embodiments also include protocols facilitating data transfer using radio frequency identification (RFID) communications and/or NFC. In some aspects, network 120 may also include one or more mobile device networks, such as a GSM network or a PCS network, allowing devices (e.g., client device 130) to send and receive data via applicable communications protocols, including those described herein.

System environment 100 may include one or more servers 110 configured to process, store, receive, obtain, and transmit information. In certain aspects, server 110 may reflect one or more computing systems (e.g., computing system 1000, a mainframe computer, etc), and may be implemented with hardware devices or software instructions to perform one or more operations consistent with the disclosed embodiments (see, e.g., the embodiments described with reference to FIGS. 1-10). The software instructions may be incorporated into a single computer, a single server, or any additional or alternative computing device apparent to one of ordinary skill in the art. Server 110 may also include distributed computing devices and computing systems, and may execute software instructions on separate computing systems and servers by remotely communicating over a network (e.g., network 120). Server 110 may represent multiple servers, and may comprise a plurality of servers or a server farm including load-balancing systems. Server 110 may also implement aspects of the disclosed embodiments without accessing other devices or networks, such as network 120.

In some embodiments, server 110 may be associated with one or more knowledge hosts. In certain embodiments, a knowledge host may be any kind of entity, such as a business, a governmental entity (e.g., a court, a federal, state, or local body, law enforcement agency, etc), an educational entity (e.g., a university, local school, etc), or the like. In other aspects, server 110 is not associated with any knowledge host.

In certain aspects, server 110 may be configured to process, facilitate, or manage one or more search engines. For example, server 110 may be configured to receive a search query transmitted over network 120 from client device 130. In some embodiments, server 110 may respond to the query by generating search results using one or more entity databases 140 and one or more context databases 150, and transmitting the search results to client device 130 over network 120 in electronic form and/or for display to a user. In one embodiment, server 110 may transmit information and/or instructions to display a search results webpage, overlay, or any other interface for display in an application running on client device 130 (e.g., a web browser, general software application, alert overlay, mobile application, etc).

In some embodiments, a search engine hosted on server 110 may identify resources matching a received query. The search engine may also identify a particular snippet, page, or section of each resource relevant to the query (e.g., the highest ranked resources that are relevant to the query). The search engine may include an indexing engine for indexing resources (e.g., webpages, images, or news articles on the Internet) found in a corpus (e.g., a collection or repository of content), an index database, knowledge base, or context base storing the index information, and a ranking engine to rank the resources matching the query. The indexing engine may index information using traditional techniques. In some embodiments, the search engine (or indexing engine thereof) may index entities (e.g., classes, subclasses, other entities, etc), attributes, contexts, context classes and entities, relationships between entities, association scores, image annotations, and facts learned about entities using processes consistent with the disclosed embodiments.

System environment 100 may include one or more entity databases 140 and one or more context databases 150 for storing, maintaining, and providing information. Computing systems within system environment 100 (e.g., server 110, client device 130, etc) may receive data stored within, and transfer data to, entity database 140 and context database 150, consistent with the disclosed embodiments. Data stored within entity database 140 and context database 150 make take or represent various forms including, for example, documents, lists, linked lists, tables, graphs (e.g., knowledge graphs and/or context graphs, such as those shown in FIGS. 2A-2C and 3), charts, textual content, index, image files, video files, audio files, user profile information, any other variety of electronic data, or any combination thereof.

Entity database 140 and context database 150 may be implemented using any combination of databases or computer-readable storage mediums. For example, entity database 140 and context database 150 may be maintained in a network attached storage device, in a storage area network, some combination thereof, etc. Entity database 140 and context database 150 may be maintained, updated, and queried using any type of database software, programming languages, or scripts such as, for instance, SQL, MySQL, IBM DB2®, Microsoft Access®, PERL, C/C++, Java®, etc. Further, although FIG. 1 shows entity database 140 and context database 150 associated with server 110, these databases may be implemented via a standalone database accessible via network 120, together or independently. Moreover, entity database 140 and context database 150 may be associated with or provided as part of a system or environment accessible to client device 130 and/or other components (e.g., stored in the memory of client device 130).

In some embodiments, entity database 140 may store, relate, manage, and/or provide information associated with one or more entities. In certain aspects, an entity may reflect a person (e.g., George Washington), place (e.g., San Francisco, Wyoming, a particular street or intersection, etc), or thing (e.g., star, car, politician, doctor, device, stadium, person, book). By way of further example, an entity may be reflect a piece of literature, an organization (e.g., New York Yankees), a political body or party, a business, a sovereign or governmental body (e.g., the United States, NATO, the FDA, etc), a date (e.g., Jul. 4, 1776), a number (e.g., 60, 3.14159, e), a letter, a state, a quality, an idea, a concept, or any combination thereof.

In some aspects, an entity may be associated with an entity class. An entity class may represent a categorization, type, or classification of a group or notional model of entities. For purposes of illustration, example entity classes may include "person," "galaxy," "baseball player," "tree," "road," "politician," etc. An entity class may be associated with one or more subclasses. In some aspects, a subclass may reflect a class of entities subsumed in a larger class (e.g., a "superclass"). In the illustrative class list above, for example, the classes "baseball player" and "politician" may be subclasses of the class "person," because all baseball players and politicians are human beings. In other embodiments, subclasses may represent classes of entities that are almost entirely, but not completely, part of a larger superclass. Such an arrangement may arise in situations containing outliers or fictional entities. For example, the class "politician" may be a subclass of the class "person," even though some fictitious entities are nonhuman politicians (e.g., "Mas Amedda"). The disclosed embodiments provide ways of handling and managing these kinds of relationships, as further described below. Both classes and subclass may represent entity classes, and may constitute entities themselves.

In some embodiments, an entity may reflect an instance of an entity class, specifically delineating it from others in that class. For example, entities may include specific items such as "Thomas Jefferson," "Andromeda Galaxy," "Mike Trout," "weeping willow," "Electric Avenue," and "Ronald Reagan." In other embodiments, an entity may include a standalone entity, not associated with any class or subclass. As used herein, the term "entity" may be associated with or refer to an entity class, subclass, instance thereof, standalone entity, or any other entity consistent with the disclosed embodiments.

Entities may be associated with one or more entity attributes and/or object attributes. In some aspects, an entity attribute may reflect a property, trait, characteristic, quality, or element of an entity class. In some aspects, every or substantially every instance of an entity class will share a common set of entity attributes. For example, the entity "person" may be associated with entity attributes "birthdate," "place of birth," "parents," "gender," or, in general, "has attribute," among others. In another example, an entity "professional sports team" may be associated with entity attributes such as "location," "annual revenue," "roster," as so on. In other embodiments, an entity attribute may describe how an entity relates to another entity. For example, entity attributes may describe relationships between entity classes such as "is a," "is a subclass of," or "is a superclass of," or "contains." For instance, the class "star" may be associated with an entity attribute "is a subclass of" with entity class "celestial object."

In certain aspects, an object attribute may reflect a relationship between an instance of an entity class with a particular attribute value. For example, the entity "George Washington" may be associated an object attribute "has birthdate" with a value "Feb. 22, 1732." In some embodiments, the value of an object attribute may itself reflect an entity. In the example above, for instance, the date "Feb. 22, 1732" may reflect an entity.

In certain aspects, an object attribute may reflect a property of a particular entity, while entity attributes may reflect properties and relationships for entire classes of entities. In this manner, entity attributes and object attributes may link, associate, or relate entities to each other and describe the relationships between them. These relationships may relate particular entities to values (e.g., an actual date), may indicate an entity class is associated with a particular attribute (e.g., a place of birth), and/or may relate one entity to another (e.g., indicating a subclass). As used herein, the term "attribute" may refer to an entity attribute, an object attribute, or both depending on the context in which it is used.

In some embodiments, entities and subclasses inherit the attributes from the superclasses from which they derive. For example, the class "U.S. President" may inherit the attribute "birthdate" from a "person" superclass. Moreover, in certain embodiments, superclasses may not necessarily inherit attributes of their subclasses. By way of example, the class "person" may not necessarily inherit the attribute "stolen bases" from the subclass "professional baseball player," or the attribute "assumed office date" from the subclass "U.S. President."

In some embodiments, context database 150 may store, relate, manage, and/or provide information associated with one or more contexts. A context may reflect a lexical construction or representation of one or more words (e.g., a word, phrase, clause, sentence, paragraph, etc) imparting meaning to one or more words (e.g., an entity) in its proximity. In certain embodiments, a context may be represented by an n-gram. An n-gram may reflect a sequence of n words, where n is a positive integer. For example, a context may include 1-grams such as "is," "was," or "concurred." In addition, exemplary contexts may include 3-grams such as, for instance, "was born on," "is married to," "stole second base," or "wrote a dissent." Contexts (and n-grams) may also include gaps of any length, such as the 2-gram "from . . . until . . . ." As described herein, an n-gram may represent any such sequence, and two n-grams need not represent the name number of words. For example, "scored a goal" and "in the final minute" may both constitute n-grams, despite containing a different number of words.

In certain embodiments, a context may indicate the potential presence of one or more entities. The one or more potential entities specified by a context may be herein referred to as "context classes" or "context entities," although these designations are for illustrative purposes only as are not intended to be limiting. Context classes may reflect a set of classes typically arising in connection with (e.g., having a lexical relationship with) the context. In some aspects, "context classes" may reflect specific entity classes. By way of example, the context "is married to" may be associated with a context class of entity "person," because the context "is married to" usually has a lexical relationship to human beings (e.g., has a lexical relationship to instances of the "person" class). In this example, for instance, the sentence "Jack is married to Jill" indicates that both "Jack" and "Jill" are of class "person," due to, at least in part, the context class(es) of the context "is married to." In another example, the context "has a pet" may be associated with context classes such as "animal," "cat, "dog," "domesticated animal," and the like. Moreover, in this alternative example, the context "has a pet" may signal the presence of entity classes that are not coextensive, because two instances of the same class typically do not share a lexical relationship (e.g., a pet-master attribute relationship). The interpretation and generation of context classes is explained in further detail below.

In certain aspects, context classes may also reflect relative entity classes. In some embodiments, the relative classes may point to the existence of particular entity classes derived from other surrounding words (e.g., proximate entities), but are not associated with specific classes themselves. For example, the context "is similar to" may not be associated with a specific entity class itself, but may instead reflect a relative entity class pointing the classes of the entities around it. Thus, the context classes associated with the context "is similar to" may include "person" with respect to the sentence "Jack is similar to Jill," but may include "dog" when the sentence reads "Rex the dog is similar to Spot."

In some embodiments, the context classes and context entities of a given context may depend in part on the subclasses, superclasses, and/or attributes of the specified entities in the context class. For example, the context classes for the context "homered off" may include the classes "baseball player," and "person," because "homered off" typically has a lexical relationship to baseball players, and "baseball player" may be a subclass of the entity "person." Using this example, "Bryce Harper homered off Michael Wacha in the 3rd" may indicate the presence of two baseball players, which in turn may indicate the presence of two persons. Moreover, the context "in the" may indicate the presence of a temporal element such as a "time" or "inning" class, as explained in the discussion of the disclosed embodiments below. The disclosed embodiments provide processes for discerning additional context classes, entities, and attributes from the foregoing examples, and the listing of certain entities and context classes above is for illustrative purposes only.

Entity database 140 and context database 150 may store, transfer, and manage information consistent with the disclosed embodiments, such as entities (e.g., classes, subclasses, class instances, etc), their associated attributes, relationships between entities, contexts, context classes, and context entities. This information may be stored in any manner or form consistent with the disclosed embodiments. Additionally or alternatively, this information may be stored in any other memory in connection with server 110, client device 130, or other memory in communication with a computing system of environment 100.

In some aspects, entity database 140 and/or context database 150 may also store information relating to one or more association scores. An association score may reflect a likelihood or degree of confidence that an attribute, attribute value, relationship, class hierarchy, designated context class, or other such association is valid, correct, and/or legitimate. In some embodiments, for example, an association score may reflect a degree of relatedness between two entities or a context and an entity. Association scores may be determined via any process consistent with the disclosed embodiments. For example, as explained in greater detail below, a computing system (e.g., server 110) may determine association scores using factors and weights such as the reliability of the sources from which the association score is generated, the frequency or number of co-occurrences between two entities in content (e.g., as a function of total occurrences, total number of documents containing one or both entities, etc), the attributes of the entities themselves (e.g., whether an entity is a subclass of another), the recency of discovered relationships (e.g., by giving more weight to more recent or older associations), whether an attribute has a known propensity to fluctuate (e.g., periodically or sporadically), the relative number of instances between entity classes, the popularity of the entities as a pair, the average, median, statistical, and/or weighted proximity between two entities in analyzed documents, and/or any other process disclosed herein. In some aspects, the system may itself generate one or more association scores. In certain aspects, the system may preload one or more association scores based on pre-generated data structures (e.g., stored in databases 140 and/or 150).

In one embodiment, for instance, a computing system (e.g., server 110) may generate an association score between a context and an entity by determining the ratio of co-occurrences between the context and the entity (e.g., the specific entity, an instance of the entity class, etc) to all occurrences of that context and/or entity across network documents. One illustrative expression, for instance, may take a form A=P(E,C)/P(C), where A is an example association value between the entity and the context, P(C) is the probability of finding the context in a section of text (e.g., a document, one or more webpages, a corpus, etc), and P(E,C) is the probability of finding both the context entity co-occur in the section. In this example, the association score may reflect the conditional probability of finding an entity E when the context C appears. Another illustrative expression for an association score may take the form of A=N(E,C)/(N(E)+N(C)−N(E,C)), where N(E) is the number of instances the entity appears in a section (e.g., a corpus), N(C) is the number of instances the context appears in the section, and N(E,C) is the number of instances of both entity E and context C appear together in the section. Similar expressions may be used to generate association scores between two entities.

By way of example, server 110 may determine that the context "receives a pass from" co-occurs with instances of the entity classes "basketball player" and "person" 35 and 97 percent of the time the context appears in all analyzed documents, respectively. The system may determine these frequencies of co-occurrence by using, at least in part, entity and context models to determine relationships between entities (e.g., to determine "LeBron James" is an instance of class "basketball player"). In this example, server 110 may determine that the association scores relating the context "receives a pass from" to "basketball player" and "person" are respectively 0.35 and 0.97.

Association scores may account for other considerations by incorporating one or more weights for each occurrence of an entity or context. In some aspects, the computing system may apply weights to account for factors such as temporal weights (e.g., to weigh recent documents or occurrences more heavily), reliability weights (e.g., to weigh more reliable sources more heavily), popularity weights (e.g., to weigh more popular sources more heavily), proximity weights (e.g., to weigh entities/contexts occurring in closer proximity to one another more heavily) and any other type of weight consistent with the disclosed embodiments. In certain aspects, a weight may reflect the relative importance of a particular document or individual occurrence compared to others (e.g., the weights for all occurrences sum to 1.0), the importance of a document or occurrence on an absolute scale (e.g., each weight reflects an independent rating), or any other measure indicating the relatedness between two entities or contexts (e.g., the proximity between a context and an entity).

In some embodiments, these weights may affect the expression for an association value. For example, in one illustrative embodiment, a computing system (e.g., server 110) may generate an association score between two entities in a corpus of documents by employing a formula such as $$A = \frac{1}{N(E_1) + N(E_2) - N(E_1, E_2)} \sum_i \sum_j w_{i,j} \delta_i,$$

where A is the association value between entities $E_1$ and $E_2$, $N(E_1)$ is the number of instances the entity $E_1$ appears in the corpus, $N(E_2)$ is the number of instances the entity $E_2$ appears in the corpus, $N(E_1,E_2)$ is the number of instances entities $E_1$ and $E_2$ co-occur in the corpus, $w_{i,j}$ reflects a factor for a weight j (e.g., a temporal weight, a reliability weight, proximity weight, etc) for occurrence i, and $\delta_i$ is a binary number reflecting whether entities $E_1$ and $E_2$ co-occur in occurrence i. The disclosed embodiments contemplate other types of expressions, and the formula above is presented for illustrative purposes only. For example, in some aspects, the weights may be multiplied instead of summed (e.g., transforming the above sum over j to a product over j). Other expressions may use other mathematical and statistical operations such as regressions, cross-correlations, autocorrelations, convolutions, standard deviations, z-scores, or any other type of operator or function. Those of ordinary skill in the art will appreciate alternative expressions and representations of association scores consistent with the disclosed embodiments. In one example, for instance, the binary value $\delta_i$ may be multiplied by a proximity factor for each occurrence i, regardless of whether such a factor appears in the set of weights $w_{i,j}$. Moreover, similar expressions may be used to generate association scores between contexts and context classes. In some embodiments, the applied weights may be stored in any suitable memory, such as databases 140 or 150, or a memory associated with a computing system of system environment 100 (e.g., server 110).

In one example, suppose a corpus contains two documents, $D_1$ and $D_2$, having reliability weights 0.70 and 0.30, respectively, and having recency weights of 0.40 and 0.60, respectively. Suppose further that a first entity $E_1$ co-occurs with a second entity $E_2$ in document $D_1$, but only $E_2$ occurs in $D_2$. In this example, a computing system (e.g., server 110) may determine an association score relating entities $E_1$ and $E_2$ has the value of 0.55 ($=\frac{1}{2} \cdot ((0.7+0.4)(1)+(0.3+0.6)(0))$). If instead entities $E_1$ and $E_2$ co-occur in the $D_2$ instead of $D_1$, for example, the system may determine the association score between the entities to be 0.45 ($=\frac{1}{2} \cdot ((0.7+0.4)(0)+(0.3+0.6)(1))$). One skilled in the art will appreciate that other types of calculations are possible (e.g., giving different weights to individual occurrences with a document, using different weights or expressions, etc).

Thus, in some embodiments, a low association score may indicate that a data source on which a relationship is based is generally untrustworthy or unreliable. In other embodiments, a low association score may indicate that co-occurrences of the subject pair do not occur in recent documents. In still other embodiments, a low association score may indicate that the co-occurrences between the pair are rare (e.g., few "politicians" are "professional basketball players"). In yet other embodiments, the association score may reflect a combination of many such factors. In some aspects, a system (e.g., server 110 or a computing system in connection with databases 140 or 150) may update and modify association scores over time (e.g., based on new documents, contexts, and attributes).

An association score may take the form of a numerical number (e.g., 0.0 to 1.0, 0 to 100, etc.), a qualitative scale (e.g., unlikely, likely, very likely), a color-coded scale, and/or any other measure or rating scheme capable of specifying levels of degree. For example, in one embodiment, entity database 140 may store an association score of 0.84 reflecting that the likelihood that entity "Bryce Harper" is associated with an attribute "birthdate" having a value "Oct. 16, 1992." This may indicate, for example, that the system considers Bryce Harper's birthdate to be Oct. 16, 1992, with 84% accuracy. In addition, "Bryce Harper" may be associated with an entity class "person" via attribute or relationship "is a" with an association score of 1.0, indicating a certainty that Bryce Harper is a person. In another example, the context "scored a goal" may be associated with context classes "soccer player," "hockey player," and "person" with association scores of 0.64, 0.49, and 0.98, respectively. These exemplary values may indicate, for instance, that it is more likely that the context pertains to soccer players over hockey players, and likelier still that the sentence pertains to one or more persons generally over soccer players in particular. As indicated above, the one or more entity databases (e.g., entity database 140) and context databases (e.g., context database 150), server 110, and/or client device 130 may store, generate, determine, archive, and index entities, attributes, contexts, context classes, association scores, and any other information in any form consistent with the disclosed embodiments.

Figure 2A:
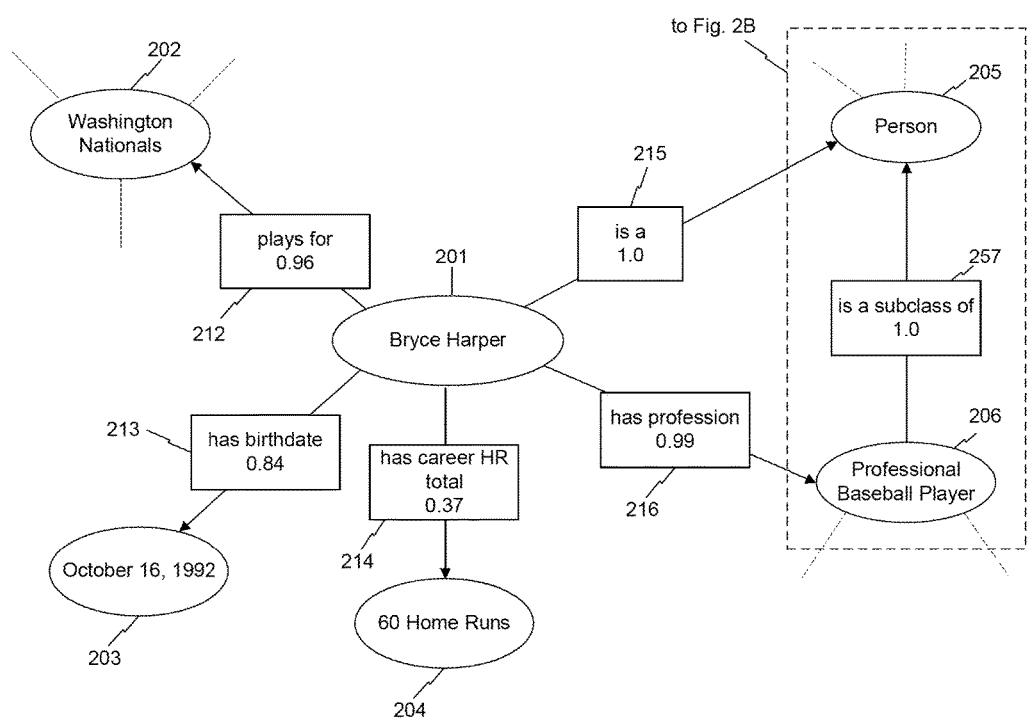
FIGS. 2A-2D depict example knowledge graphs and context graphs consistent with the disclosed embodiments.

FIGS. 2A-2D illustrate certain aspects of the foregoing embodiments and depict example data structures for implementing them. For example, FIG. 2A depicts an example knowledge graph, consistent with the disclosed embodiments. In some aspects, the knowledge graph may comprise a plurality of nodes, each node reflecting an entity. The knowledge graph may also include one or more edges reflecting attributes describing relationships between the entities and the values of particular attributes. In certain embodiments, the knowledge graph may also include an association score for each edge (e.g., each attribute or associated value) contained therein, although such association scores are not required. In the illustrative knowledge graph depicted in FIG. 2A, for instance, the entity node "Bryce Harper" 201, reflecting a particular entity, is connected to another entity "Washington Nationals" 202 via object attribute "plays for" 212 with association score 0.96. These values and relationships may indicate, for example, that Bryce Harper is a player for the Washington Nationals and that the system associates this attribute with a degree of confidence of 0.96. The entity "Washington Nationals" 202 itself may be associated with other entities not shown, indicated by the hashed lines emanating from the node 202. Other entities depicted in FIGS. 2A-2C and 3 can similarly be associated with other nodes and attributes not shown, and the depiction of certain relationships and values therein is merely illustrative.

FIG. 2A also depicts associating the node "Bryce Harper" 201 with date entity node "Oct. 16, 1992" 203 and value entity node "60 Home Runs" 204 via attributes "has birthday" and "has career HR total," respectively. These attributes have respective association scores of 0.84 and 0.37, indicating that the system is more confident in the value associated with attribute relationship "has birthdate" 213 than the value associated with "has career HR total" 214. The difference in these association scores may arise, for instance, due to the reliability of the sources used to generate such relationships, the frequency of co-occurrences between the entities, the fact that one of the attributes values (node 204) is changing over time, and/or other factors, consistent with the disclosed embodiments.

An entity node may also be associated with entity classes and subclasses, connected via attributes describing the nature of the relationship between an entity and an entity class. For example, FIG. 2A depicts connections between node "Bryce Harper" 201 and the entity classes "person" 205 and "professional baseball player" 206 via respective edges "is a" 215 and "has profession" 216. These attributes have association scores of 1.0 and 0.99, respectively. The illustrative attributes and association scores indicate that the system considers Bryce Harper to be a person whose profession is a professional baseball player with a certainty or near certainty.

As shown in FIG. 2A, entity classes can also be associated with each other through attributes and accompanying association scores. For example, FIG. 2A connects the class "professional baseball player" 206 with the class "person" 205 via attribute "is a subclass of" 257. The corresponding association score is 1.0, thereby indicating that the class "professional baseball player" is a subclass of the "person" class to a certainty.

Figure 2B:
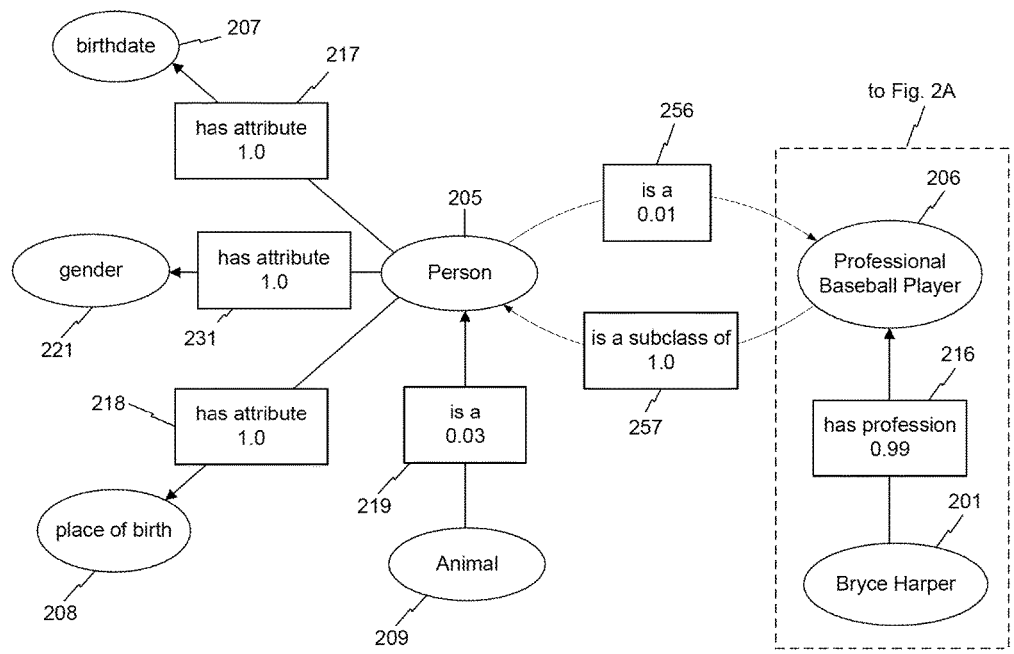

FIG. 2B depicts an example knowledge graph relating entity classes to other classes and entity attributes, consistent with the disclosed embodiments. As shown in FIG. 2B, for example, the entity class "person" 205 may be associated with attributes "birthdate" 207, "gender" 221, and "place of birth" 208 via "has attribute" attributes 217, 231, and 208, respectively. These relationships may each include an association score of 1.0, indicating that the system is certain that every member (or near every member) of class "person" has these attributes (e.g., as shown by attribute 213 in FIG. 2A).

As depicted in FIG. 2B, an entity class may also be associated with other entity classes through entity attributes. For example, the class "animal" 209 may be associated with the class "person" 205 via attribute "is a" 219. In this example, the association score corresponding the attribute is 0.03. This may indicate, for example, that instances of the "animal" class 209 are rarely instances of "person" class 205 (e.g., due to the prevalence of nonhuman animals such as other mammals, insects, birds, fish, etc). While not depicted in FIG. 2B, the class "person" 205 may be associated with a reciprocal attribute "is a" or "is a subclass of," etc, in connection with "animal" node 209. Such an attribute may be associated with a higher association score (e.g., 0.94), indicating that the class "person" is a subclass of "animal." For example, FIG. 2B depicts the class "professional baseball player" 206 associating with the class "person" 205 with the entity attribute "is a subclass of" 257 with association score 1.0. In contrast, the class node "person" 205 may associated with the node "professional baseball player" 206 via attribute "is a" 256 with association score 0.01. This lower association score may reflect, for example, the strong prevalence of entities of class "person" that are not of class "professional baseball player" (e.g., most people are not professional baseball players). FIG. 2B further depicts how the professional baseball player class node 206 may associate with entity node "Bryce Harper" 201 via attribute "has profession" 216, as discussed in connection with FIG. 2A.

Figure 2C:
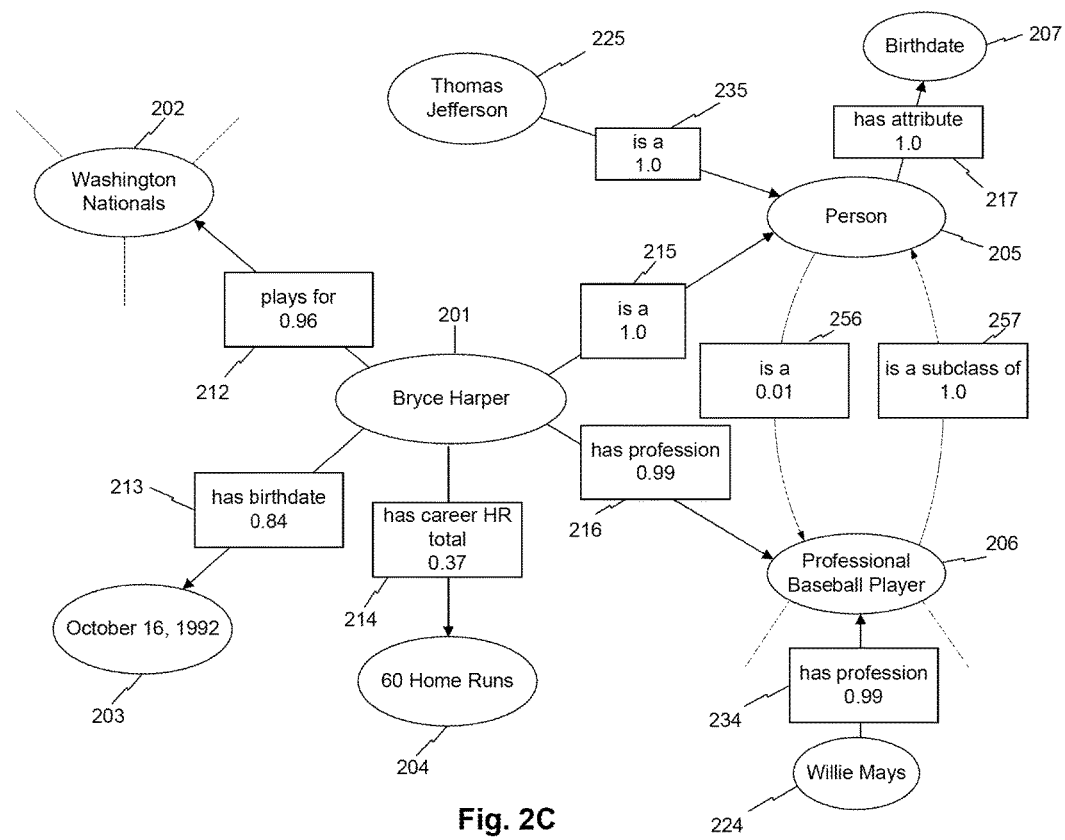

FIG. 2C depicts another example knowledge graph, consistent with the disclosed embodiments. In general, FIG. 2C illustrates an assimilation of FIGS. 2A and 2B into a single knowledge graph. FIG. 2C further depicts how other entities may relate to the combined graph and how new relationships can be determined. For example, the entity "Willie Mays" 224 may be associated with the entity class "professional baseball player" 206 via "has profession" attribute 234. Given the subclass relationship between the professional baseball player class 206 and the person class 205, and the high association scores between nodes 224 and 205 (0.99 and 1.0, respectively), these attributes may suggest that Willie Mays is a member of the class "person" (edge not shown). In contrast, the node "Thomas Jefferson" 225 is associated with the class "person" 205 via attribute "is a" 235 with association score 1.0. In this example, however, the class "person" 205 is associated in the direction of the node "professional baseball player" 206 with attribute "is a" 256 with an association score of only 0.01. Given the low association score 256, the system (e.g., server 110), may determine that it is unlikely that Thomas Jefferson was a baseball player.

Figure 2D:
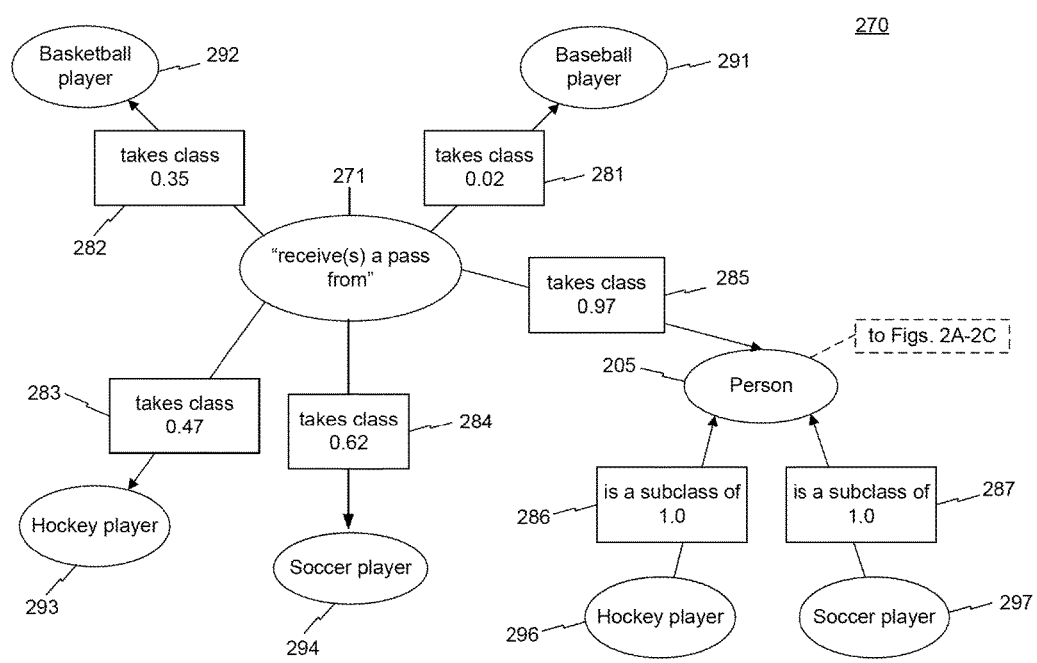

FIG. 2D depicts an example context graph 270, consistent with the disclosed embodiments. Like FIGS. 2A-2C, the context graph 270 may include a plurality of nodes, each node reflecting a context (e.g., an n-gram) and/or an entity class. In some embodiments, the context graph 270 may also include one or more edges reflecting the relationships between the contexts and the entity classes. While FIG. 2D depicts only one context and several entity classes, the disclosed embodiments contemplate that the context graph 270 may include any number of contexts and entity classes.

In some embodiments, the entity classes included in the context graph 270 may represent context classes associated with a particular context (e.g., context 271). In such embodiments, an association score linking contexts to their context classes (and any included subclasses, etc), may reflect a degree of validity or relatedness between the context class and the context (e.g., edge 281) and/or the degree of relatedness between entity classes themselves (e.g., edge 286). In some aspects, the association score may thus reflect a likelihood that context 271 signals the presence of the associated context class or an instance of that context class. For example, as shown in FIG. 2D, the context node "receive(s) a pass from" 271 may be associated with five context classes 205 and 291-294. In this example, the context "receive(s) a pass from" 271 is associated with context classes "person" 205, "baseball player" 291, "basketball player" 292, "hockey player" 293, and "soccer player" 294 Each of these associations may include a corresponding association score, such as scores 281-285. These association scores are illustrated with the accompanying phrase "takes class" to indicate a likelihood or probability that the context 271 indicates the presence of a particular class or class instance.

For example, because it may be rare for a member of class "baseball player" 291 to "receive(s) a pass from" (context 271) another player, the association score associated with this context class is 0.02, as shown in line item 281. As explained above, this value may be generated from the frequency of co-occurrences between the context and an instance of the "baseball player" class over network sources, the reliability of those sources, etc. In contrast, the association scores between context 271 and the remaining entity classes 292-294 and 205 is relatively higher. For example, the association scores for the context classes "hockey player," "soccer player," and "person" are 0.47, 0.62, and 0.97, respectively. These values may indicate that, in a vacuum, the context 271 is more likely to refer to a soccer player than a hockey player, but it most likely to refer to an entity of the class "person" (e.g., as opposed to a court, agency, or organization, etc).

While the foregoing embodiments have been described in relation to particular illustrations, depictions, and representations of entities, attributes, and contexts, the disclosed embodiments are agnostic to the form this information make take. For example, the disclosed embodiments may use or implement any data structure or information scheme capable of storing information and related values including, but not limited to, database schemas, tables, lists, textual data, other types of charts, or any other kind of data structure capable of representing an entity model or context model. Further, while the foregoing embodiments illustrate a relatively simple set of nodes and edges, the disclosed embodiments contemplate the use of more complex relationships, encompassing any number of entities, attributes, and contexts, spanning a single or several such graphs or data files. Moreover, the foregoing embodiments may be combined and separated into different data structures. For example, a context model (e.g., the context graph depicted in FIG. 2D) may be incorporated into an entity model (e.g., the knowledge graphs of FIGS. 2A-2C), as indicated by the dashed line emanating from the "person" node 205 in FIG. 2D. Alternatively or additionally, the context and entity models may be separated from themselves and each other.

Systems and methods consistent with some embodiments may identify entities from documents, assign entity classes to them, and associate them with properties. The assigned classes and attributes may be based, at least in part, on the context in which the new entity appears, the entity classes of entities proximate to the new entity, relationships between entity classes, association scores, and other factors. Once assigned, these classes and attributes may be updated in real time as the system traverses additional documents and materials. The disclosed embodiments may then permit access to these entity and context models via search engines, which may improve the accuracy, efficiency, and relevance of search engines and/or searching routines.

Figure 3:
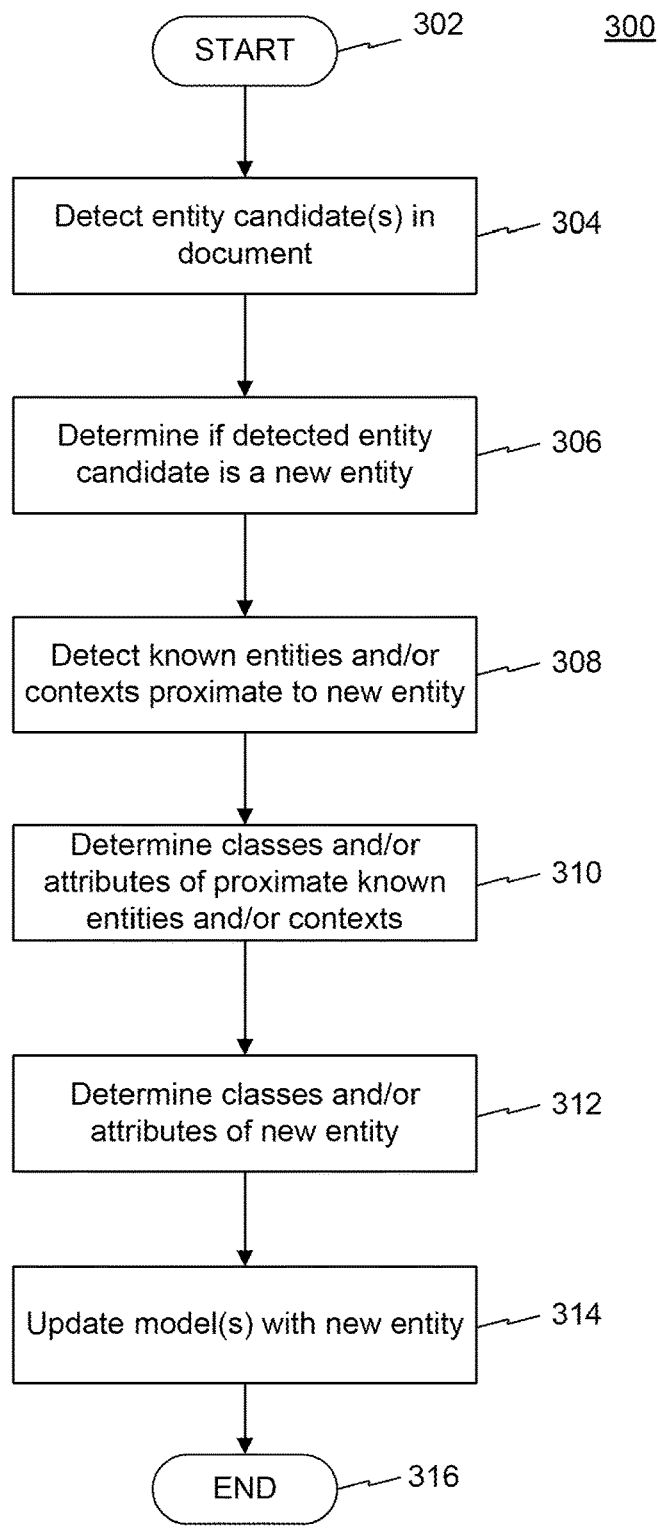
FIG. 3 is a flowchart depicting an example new entity identification and classification process consistent with the disclosed embodiments.

FIG. 3 is a flowchart depicting an example new entity identification and classification process 300 consistent with the disclosed embodiments. Some embodiments consistent with process 300 may be used to identify new entities and assign them generated properties, attributes, and/or classes. The example process 300 may be implemented via hardware and/or software on one or more of the components of system environment 100 such as server 110, client device 130, a computing device (e.g., computing device 1000) in communication with databases 140 and 150, or any combination thereof. Moreover, in certain aspects, process 300 may occur or be implemented as a standalone process. In other embodiments, process 300 may take place in the context of other processes.

In the example process 300 of FIG. 3, the process begins (step 302) by detecting one or more entity candidates in a network document (step 304). In some aspects, an entity candidate may reflect an n-gram potentially containing or representing a new entity. Process 300 may detect these entity candidates using processes consistent with the disclosed embodiments (e.g., those described in connection with FIGS. 4 and 5). For example, in one aspect, a system running process 300 may determine that an n-gram likely corresponds to a noun and is also not contained in an entity model (e.g., stored in entity database 140). In some embodiments, when the system determines that the detected entity candidate is not included in one or more entity models, the system may determine that the entity candidate as a new entity (step 306).

Process 300 may include detecting one or more known entities and/or one or more contexts proximate to a new entity (step 308). In some aspects, a known entity may reflect an entity (e.g., represented by an n-gram) for which certain information such as attributes, relationships, and association scores have been previously determined or estimated. This information may be generated or preloaded via the processes consistent with the disclosed embodiments (e.g., as described in connection with FIGS. 5-7). Process 300 may also include identifying a proximate context to the new entity. In certain embodiments, process 300 may determine the context by identifying an n-gram proximate to the new entity having a lexical relationship with the known entity (or vice versa). In some aspects, information associated with the known entity and the contextual relationships may be generated by a system running process 300 or based on predetermined data structures (e.g., as stored in entity database or context database 140 and 150).

In some embodiments, process 300 may limit the detection of known entities and/or contexts to n-grams appearing or occurring within a certain proximity threshold number of words from the new entity, each other, or both. Moreover, this proximity threshold may be different for the n-grams associated with the known entities or contexts. For example, process 300 may limit the proximity threshold of known entities to within ten words of the new entity while limiting those of contexts to five words of the new entity. Additionally or alternatively, these proximity thresholds may incorporate several such proximity thresholds. For example, process 300 may limit the proximity threshold for known entities to those occurring within a first threshold number of words to the new entity, a second threshold number of words to a context n-gram, and a third threshold number of words to other known entities. Proximity thresholds may also incorporate other information consistent with the disclosed embodiments, such as requiring proximate entities and/or contexts to occur within a same section of prose (e.g., a sentence, a paragraph, etc.) as the new entity, each other, or both.

Process 300 may also include determining one or more entities (e.g., entity classes), attributes, and/or association scores corresponding to the proximate known entity and context (step 310). In some embodiments, for instance, process 300 may determine an entity class associated with the known entity and the context proximate to the new entity. A system running implementing process 300 may determine this information via processes consistent with the disclosed embodiments (e.g., as described in connection with FIG. 6). For example, the system may determine one or more entity classes related to the known entity and the context by finding this information in an entity or context model, such as those stored in databases 140 and 150.

After determining the classes and other information relating to the known entity and context, process 300 may include determining one or more classes and/or attributes of the new entity (step 312). In some aspects, process 300 may make this determination based on the values of the previously-determined classes of the context and known entity using the processes discussed below (e.g., as described in connection with FIGS. 6 and 7). For example, if process 300 determines the context "cosponsored a bill with" is typically associated with (e.g., has a lexical relationship with) entities of class "politician" and/or "person," and process 300 detects known entities proximate to the new entity are instances of the classes "politician" and "person," then process 300 may determine that the new entity is likely an instance of the "politician" and "person" person entity classes. In some aspects, these determinations may also be based on the association values corresponding to these relationships, as further explained below. Moreover, even small changes to the determined context or known entities may produce different classifications and attributes for the new entity. For example, if the context in the above example were "cosponsor a bill on," rather than "cosponsor a bill with," process 300 may determine the new entity to be associated with a different entity class (e.g., "tax reform," "free speech," etc) based on the processes described herein.

Process 300 may include updating entity models and/or context models based on the determined classes, attributes, association scores, and other information of the new entity (step 314). For example, in one embodiment, process 300 may store information describing a relationship or association between the new entity and its determined classes and attributes in an entity model stored in a database (e.g., entity database 140). This process may also include updating one or more association scores of the subject entities to reflect the newly-defined relationship. Updating such models may be performed using processes consistent with the disclosed embodiments (e.g., as described in connection with FIG. 6). Process 300 may also update one or more context models in a similar fashion (e.g., to reflect a relationship between the context and the new entity and its corresponding entity classes). In this manner, process 300 may provide entity models and context models continually populated with new entities and relationships, updated in real-time or near real-time. In some aspects, when process 300 has stored the new entity and its relationships in one or more data models, the process may terminate or continue for further processing consistent with the disclosed embodiments (step 316).

Figure 4:
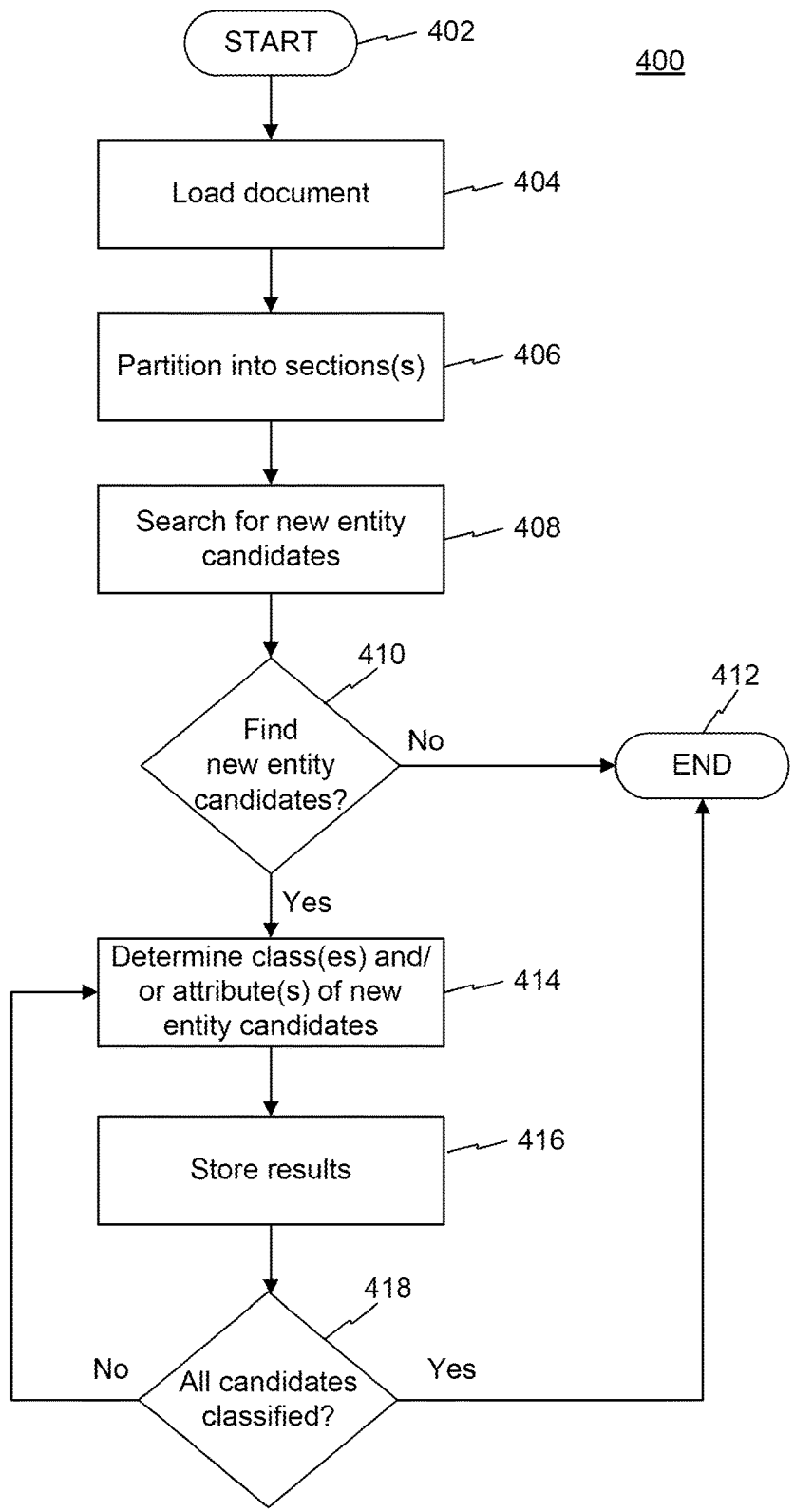
FIG. 4 is a flowchart depicting an example document parsing process consistent with the disclosed embodiments.

FIG. 4 is a flowchart depicting an example document parsing process 400, consistent with the disclosed embodiments. In some aspects, the embodiments described in connection with process 400 may be implemented via hardware and/or software on one or more of the components of system environment 100 such as server 110, client device 130, a computing device (e.g., computing device 1000) in communication with databases 140 and 150, or any combination thereof.

In the example process 400 of FIG. 4, the process begins (step 402) by loading a document (step 404). The loaded document may constitute any data file capable of containing text-based information, such as a webpage, word processing document, presentation, chart, graph, spreadsheet, news article, tweet, comment, annotation, white paper, textbook, and the like. Process 400 may load the document by, for instance, reading it into memory, retrieving it from a database or corpus, obtaining the document over a network, crawling webpages over the Internet, etc.

Process 400 may include partitioning the loaded document into one or more sections (step 406). A section may represent a segment of one or more words (e.g., a word, phrase, clause, sentence, paragraph, etc). In one embodiment, for example, the system may partition the document into segments, each segment being one sentence long. In other aspects, sections may span several sentences, entire paragraphs, or longer. Moreover, in some aspects, a portion of the document may be partitioned into two sections (e.g., a section spanning a sentence, and a second section spanning the entire paragraph in which the sentence appears).

As illustrated in FIG. 4, the process 400 may then search for new entity candidates in some or all of the sections (step 408). As discussed above, new entity candidates may reflect n-grams potentially containing or representing a new entity. For example, as discussed in connection with entities, the n-grams may be specific, referring to a particular object or instance of a more general class of entities (e.g., books, movies, trees, things, etc). For example, new entity candidates may take the form of n-grams such as "Nexus 6," "Harry Potter and the Prisoner of Azkaban," or "Chrono Trigger." In other embodiments, the n-grams may be more general, referring to a potential entity class, or any other entity such as a thing or concept (e.g., "streaming video," "planet," or "arachnid"). In certain aspects, process 400 may identify and detect such new entity candidates using processes consistent with the disclosed embodiments (see, e.g., the embodiments described in connection with FIG. 5).

When the process 400 finishes searching for new entity candidates, the system may determine whether any new entity candidates have been identified (step 410). If not, the process 400 may end or otherwise continue to conduct processes consistent with the disclosed embodiments (step 412). If the system has found one or more new entity candidates, process 400 may include determining whether the new entity candidate is in fact a new entity using processes consistent with those disclosed herein. If so, the process 400 may include determining one or more entity classes and/or attributes of the new entity (step 414). This procedure may take the form of any process consistent with the disclosed embodiments (see, e.g., the embodiment described in connection with FIG. 6). In some embodiments, this step may also include generating or determining one or more association scores corresponding to the identified classes and attributes. For example, the system may determine that new entity "John Doe" is likely an instance of a class "professor," (which may be in turn a subclass of the classes "teacher" or "person," etc,) and has birthdate "Sep. 28, 1972." Further, process 400 may include generating association scores representing the degree of certainty the system associates with these relationships.

In certain aspects, the process 400 may include associating the new entity with the identified classes, attributes, and/or association scores, and storing the result (step 416). This information may be stored, for example, as data in a knowledge graph (e.g., with nodes and edges reflecting the new entity, its classes, attributes, and corresponding association scores, etc.), information in a database (e.g., entity database 140), table, or list, or any other capable data structure.

In some embodiments, process 400 may then determine whether all of the new entity candidates have been classified (e.g., have had their entity status determined) or otherwise discarded (step 418). If so, process 400 may terminate or continue to conduct processing consistent with the disclosed embodiments (step 412). If one or more new entity candidates remain unclassified, then the system may return to the one or more new entity candidates and determine whether the candidate is a new entity. If so, then the process 400 determines its classes, attributes, and/or association scores as disclosed herein (e.g., step 414).

Figure 5:
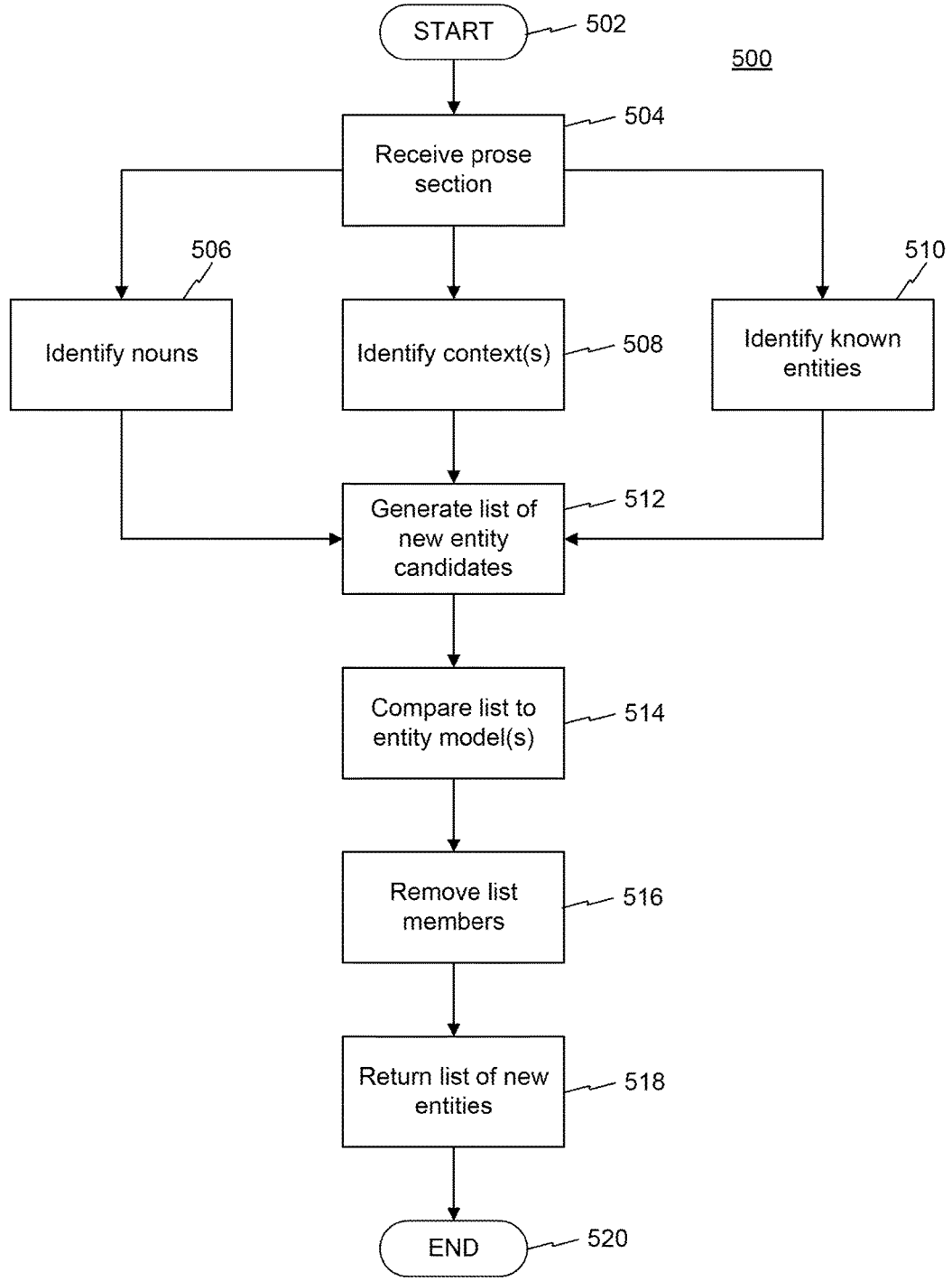
FIG. 5 is a flowchart depicting an example new entity candidate identification process consistent with the disclosed embodiments.

FIG. 5 is a flowchart depicting an example new entity candidate identification process 500, consistent with the disclosed embodiments. In some aspects, the embodiments described in connection with process 500 may be implemented via hardware and/or software on one or more of the components of system environment 100 such as server 110, client device 130, a computing device (e.g., computing device 1000) in communication with databases 140 and 150, or any combination thereof. In certain aspects, process 500 may occur as a standalone process. In other embodiments, process 500 may take place in the context of other processes (e.g., as part of searching for new entity candidates in step 408 of FIG. 4).

As illustrated in FIG. 5, process 500 begins (step 502) by receiving, retrieving, loading, collecting, segmenting, isolating, or obtaining a section of prose text (step 504). This prose section may reflect an isolated text segment of any length (e.g., a word, phrase, sentence, paragraph, entire document, etc.). In certain embodiments, the prose section may also arise from other processes disclosed herein (see, e.g., the partitioning a document in step 406 of FIG. 4).

In some aspects, process 500 may identify or detect new entity candidates in a section of prose by parsing the section to identify nouns (step 506). The detected nouns may reflect, for instance, either proper or common nouns. Process 500 may determine that a word is a noun by, for example, identifying the word in standard or specialized dictionaries, determining the word exists in a knowledge or context graph, scanning for capitalized words, identifying the word in a list of proper names or entities, etc. In some embodiments, process 500 may identify one or more of the detected nouns as new entity candidates. For example, in a prose section such as "The Moto 360 is the watch to beat," process 500 may determine that the n-grams "Moto 360" and "watch" reflect proper and common nouns, respectively, and thus may represent new entity candidates. Process 500 may also determine a probability that a word reflects a noun based on the above and other factors (e.g., association scores in entity models or knowledge graphs). In such cases, process 500 may identify a word is a new entity candidate when its probability of constituting a noun exceeds some threshold.

Process 500 may also identify new entity candidates by identifying or detecting one or more context(s) in the prose section (step 508). The identified contexts may indicate the presence or likelihood of one or more new entity candidates. This identification may occur due to any process consistent with the disclosed embodiments. For example, a system may determine that a context typically refers to a noun or entity based on a historical analysis of the same or similar contexts in past documents. In another example, process 500 may determine that a context is typically associated with a noun based on a frequency or number of co-occurrences between the context and a noun object (e.g., and/or comparing that value to a threshold, etc). Process 500 may also refer to context graphs or similar tables to find the identified context, determine the context is associated with a context class, and so forth. These processes may also determine the likelihood or probability that a particular n-gram is a noun (e.g., based on association scores of the contexts, co-occurrence values, etc). In some embodiments, identifying one or more contexts of a section may supplement, replace, or occur in lieu of other processes for detecting new entity candidates (e.g., steps 506 and 510).

By way of illustration, process 500 may receive a prose section reading "Steve was arrested while under the influence of dextroamphetamine." Process 500 may scan the section, identify the context "was under the influence of," and recognize this context typically precedes a noun. This determination may stem, for example, from the factors discussed above (e.g., entries in a context graph, co-occurrence values and thresholds, etc). In this example, process 500 may determine the probability that "dextroamphetamine" is a noun exceeds a predetermined threshold, and flag "dextroamphetamine" as a new entity candidate. In a similar fashion, process 500 may identify "Steve" as a new entity candidate based on the same context or a different context such as, for example, "was arrested." The system may determine that the context "was arrest" typically follows a noun based on the same kinds of analysis and factors disclosed herein.

Additionally or alternatively, process 500 may identify new entity candidates by detecting one or more known entities in proximity to an unknown entity or word (step 510). In some embodiments, a known entity may represent an entity already included in an entity model such as a knowledge graph or other data structure stored in entity database 140. Process 500 may determine or assume that similar entities typically appear close to one another based on historical or co-occurrence analyses as described above, and may use this determination to detect new entity candidates. This process may take place independently or in conjunction with other processes (e.g., steps 506 and 508).

For example, process 500 may parse a prose section such as "Ciproflaxin is an antibiotic in a group of drugs called fluoroquinolones." Process 500 may determine that "fluoroquinolones" is an unknown entity based on its absence in a knowledge graph or other entity model associated with entity database 140. In this example, process 500 may also determine that the terms "Ciproflaxin," "antibiotic," and "drugs" reflect known entities based on entries containing these words in an entity model. Process 500 may also determine a likelihood that these terms exist in proximity to other nouns based on the above factors (e.g., historical co-occurrences). The system may then identify the term "fluoroquinolones" as a new entity candidate based on the proximity of known entities and/or the determined probability. In this manner, process 500 may identify "fluoroquinolones" as a new entity candidate with or without necessarily identifying "fluoroquinolones" as a noun per se or identifying a context in the prose section.

As shown in the example embodiment of FIG. 5, process 500 may include generating a list of the new entity candidates (step 512). This list may include, for example, any or all of the new entity candidates detected in optional steps 506, 508, or 510. The generated list may also include only those n-grams whose probability of constituting a noun exceeds a threshold. In some aspects, this list may also be generated, if at all, during the identification of new entity candidates in steps 506, 508, and/or 510.

Process 500 may also compare the new entity candidates to one or more entity models to determine if the new entity candidate is already a known entity (step 514). In some embodiments, process 500 may determine that a new entity candidate is a known entity when it identifies an entry in one of the entity models for that candidate (e.g., an entity model contains the new entity candidate). For example, process 500 may determine that a new entity candidate exists as a node in a knowledge graph or row/column of an entity database stored in entity database 140 or context database 150. In some embodiments, these processes may take place concurrently with the identification of new entity candidates. In one embodiment, for instance, process 500 may determine that an n-gram is a new entity candidate based on its absence from entity models. In this example, process 500 may not identify the n-gram as a new entity candidate when an entry for the term already exists.

When process 500 determines that a new entity candidate is a known entity, process 500 may remove the candidate from the list of new entity candidates (step 516). Process 500 may also remove new entity candidates when, for instance, their probability of constituting a new entity falls below a threshold. In other embodiments, such as the entity modification processes described in connection with FIG. 9, process 500 may not remove known entities from the list. In some embodiments, when process 500 removes the known entities or unlikely new entity candidates from the list, the list may contain entries of new entities. Process 500 may return, transmit, or send this list of new entities to other embodiments disclosed herein for further processing (step 520).

Figure 6:
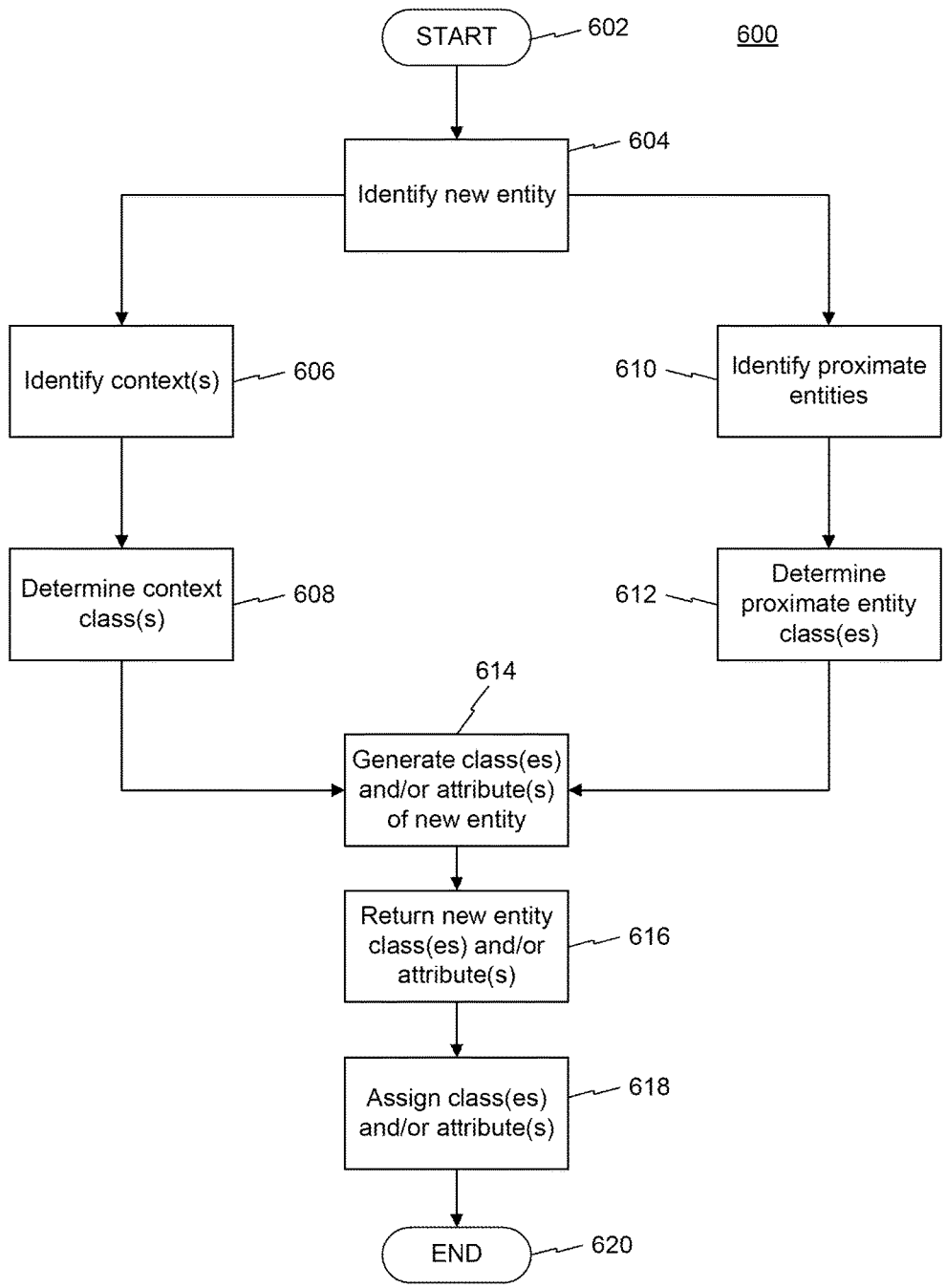
FIG. 6 is a flowchart of an example new entity class and attribute assignment process consistent with the disclosed embodiments.

FIG. 6 is a flowchart of an example new entity class and attribute assignment process 600, consistent with the disclosed embodiments. Processes consistent process 600 may be used to identify, determine, and assign classes, attributes, and their accompanying association scores to new entities. In some aspects, the embodiments described in connection with process 600 may be implemented via hardware and/or software on one or more of the components of system environment 100 such as server 110, client device 130, a computing device (e.g., computing device 1000) in communication with databases 140 and 150, or any combination thereof. Process 600 and the embodiments therein may occur as a standalone process or as part of a broader processing scheme (e.g., as described in connection with FIG. 4).

As shown in FIG. 6, process 600 begins (step 602) by receiving, identifying, or detecting a new entity (step 604). Process 600 may detect a new entity using a process consistent with the disclosed embodiments. For example, process 600 may receive a list of new entities, or independently detect such new entities, from processes consistent with those disclosed in connection with FIGS. 4 and 5.

In certain aspects, the new entity may appear in a section of prose comprising one or more words. In some embodiments, process 600 may identify one or more contexts contained in the section of prose proximate to the new entity (step 606). Process 600 may identify a context by detecting the presence of certain parts of speech (e.g., verbs, adjectives, adverbs, prepositions, noun absolutes, etc), referring to entries in a context model, or any process known to one of skill in the art. In some aspects, process 600 may expand, combine, or splice contexts or n-grams as necessary to generate a relevant context. In certain aspects, the context may appear adjacent to the new entity or separate from the new entity by a gap of one or more words, so long as the context appears in the same section. As discussed above, a context may reflect a lexical construction or representation of one or more words imparting meaning to other words in its proximity and may take the form of an n-gram proximate to the new entity.

For example, in a section of prose reading "Barack Obama met with John Doe to discuss foreign affairs," process 600 may have determined that "John Doe" is a new entity (e.g., because it does not exist in an existing entity model). Process 600 may then identify contexts proximate to the new entity by, for example, detecting the verbs "met" and "discuss" and/or expanding these contexts to "met with" and "to discuss." Similarly, process 600 may combine the contexts together to form a single context "met with . . . to discuss . . . ."

As further illustrated in FIG. 6, process 600 may determine one or more context classes associated with the identified context(s) (step 608). As discussed above, the context classes may reflect that an identified context is typically associated with, or "takes," a particular entity or class of entities. In certain aspects, process 600 may determine the context classes of the identified context using any process consistent with the disclosed embodiments. For example, process 600 may determine the context classes associated with a particular context by determining that the context appears as an entry or node a context model (e.g., a context graph). In this example, process 600 may identify the one or more context classes associated with a given context by determining the entities (e.g., entity classes) linked to or corresponding to the context. In another example, process 600 may determine the context class by determining a frequency of co-occurrences between the context and an instance of an entity class.

By way of illustration, process 600 may determine that a context proximate to a new entity comprises the phrase "receives a pass from." Process 600 may refer to a context model (e.g., a context graph as depicted in FIG. 2D), and determine that the context is included as an entry in the model (e.g., node 271). Process 600 may then determine that the context is associated with one or more context classes by determining that the entry for the context includes references (e.g., edges 311-315) to one or more entity classes (e.g., nodes 205 and 321-324). Process 600 may perform similar types of lookups, database queries, and references depending on the form of the context model (e.g., as a list, database entry, or table). In this manner, process 600 may iterate through the one or more contexts proximate to a known entity, and determine the relevant context classes associated with the contexts.

In addition to, or in lieu of, determining the context classes association with a proximate context, process 600 may identify one or more known entities proximate to the new entity (step 610). Process 600 may determine the presence of known entities by, for example, determining that one or more n-grams in proximity to the new entity is contained in an entity model (e.g., a knowledge graph). In some embodiments, the known entities may be adjacent to or separated from the new entity, so long as they appear in the same section of prose. For example, in a prose section such as "Michael Doe struck out on a fastball from Mariano Rivera," process 600 may determine "fastball" and "Mariano Rivera" to be known entities proximate to a new entity, "Michael Doe."

Process 600 may then determine one or more entity classes and/or attributes associated with the known entities (step 612). Process 600 may determine these classes and attributes by, for example, determining the classes and attributes associated with the known entities in an entity model (e.g., a knowledge graph). Process 600 may also obtain or determine the association scores, if any, corresponding to the determined attributes and referenced entities. In the above example, the identified attributes, classes, and accompanying association scores may exist as references, links, or other types of entries in the entity model, such as the edges of the knowledge graphs depicted in FIGS. 2A-2C.

For example, process 600 may receive a section of prose reading "Kepler-438b is a newly-discovered exoplanet having a size similar to Earth." Process 600 may have identified "Kepler-438b" as a new entity via any process disclosed herein (e.g., processes consistent with process 500). In this example, process 600 may scan the prose section and determine that the n-grams such as "exoplanet," "size," and "Earth" are both included in an available entity model and proximate to the new entity. Process 600 may then determine the classes, attributes, and association scores corresponding to these known entities in the entity model. For example, process 600 may identify the edges emanating from the nodes associated with the known entities in the entity model, look up their corresponding values in a table or list, etc. Using such methods, process 600 may thus determine one or more entities, attributes, and/or association scores associated with the proximate known entities.

In certain aspects, process 600 may use the proximate context classes and/or the known entity classes to generate one or more entities, attributes, and/or association scores for the new entity (step 614). Process 600 may determine these values and parameters through any process consistent with the disclosed embodiments (e.g., the processes discussed in connection with FIGS. 6 and 7). In one aspect, for instance, process 600 may determine one or more entity classes for the new entity based on one or more of the classes associated with the proximate known entities and/or context classes. For example, in the exemplary prose section "Kepler-438b is a newly-discovered exoplanet having a size similar to Earth," process 600 may determine that the proximate known entities "exoplanet" and "Earth" are both associated with the class "planet." Further, process 600 may determine that the class "planet" may have an entity attribute "has size" with the other proximate entity "size." Further still, process 600 may determine that the context class of the proximate contexts (e.g., "is an," and/or "similar to") may contain relative context classes, signaling the presence of entity classes similar to the entities around them (e.g., "planet"). Based on these determinations and others consistent with the disclosed embodiments, process 600 may determine that the new entity is associated with the class "planet."

In some aspects, process 600 may also determine one or more subclasses or superclasses for the new entity based on the foregoing parameters. For example, using the same prose section above, process 600 may determine that the class "planet" is a subclass of "celestial object" based on finding such a relationship in an entity model. Based on this determination, process 600 may then determine that the new entity is an instance of the superclass "celestial object." In another example, process 600 may use the context "similar to" and the known entities "size" and "Earth," as well as their associated classes, to determine that the new entity may be an instance of a class "Earth-like planets," a subclass of the class "planet."

In certain embodiments, process 600 may also determine one or more attributes and/or their corresponding values for the new entity based on the identified proximate entity classes, context classes, attributes, and/or association scores. For example, as explained above, process 600 may determine that the new entity is an instance of a class "planet" having an entity attribute "size" (e.g., based on detecting such a relationship in an entity model). Process 600 may thus determine that the new entity has an attribute "has size" or "has mass," etc. Moreover, having identified the context "is similar to" and the known entities "size" and "Earth," process 600 may then determine that the new entity may have a size equal to or approximate to Earth. In this manner, process 600 may use this determination to generate attributes and their values for a new entity based on the surrounding context and other known entities.

Referring again to FIG. 6, process 600 may return the determined or identified classes, subclasses, superclasses, attributes, and attribute values for further processing consistent with the disclosed embodiments (step 616). In one example, process 600 may assign these parameters to the new entity and store or incorporate the associations to an existing entity model (step 618). For example, process 600 may add nodes and edges to an existing knowledge graph representing the new entity and its determined attribute and class relationships. The disclosed embodiments may then use this assigned or generated information to conduct further processing (e.g., to process search queries) (step 620).

For example, a system such as server 110 may respond to search queries (e.g., from client device 130) using the newly assigned relationships and attributes. For example, if a user transmits a search query such as: "Earth-sized planets," the server 130 may use the updated entity model to satisfy the search query by including in its response links, text, or other information related to the new entity "Kepler-438b."

Figure 7:
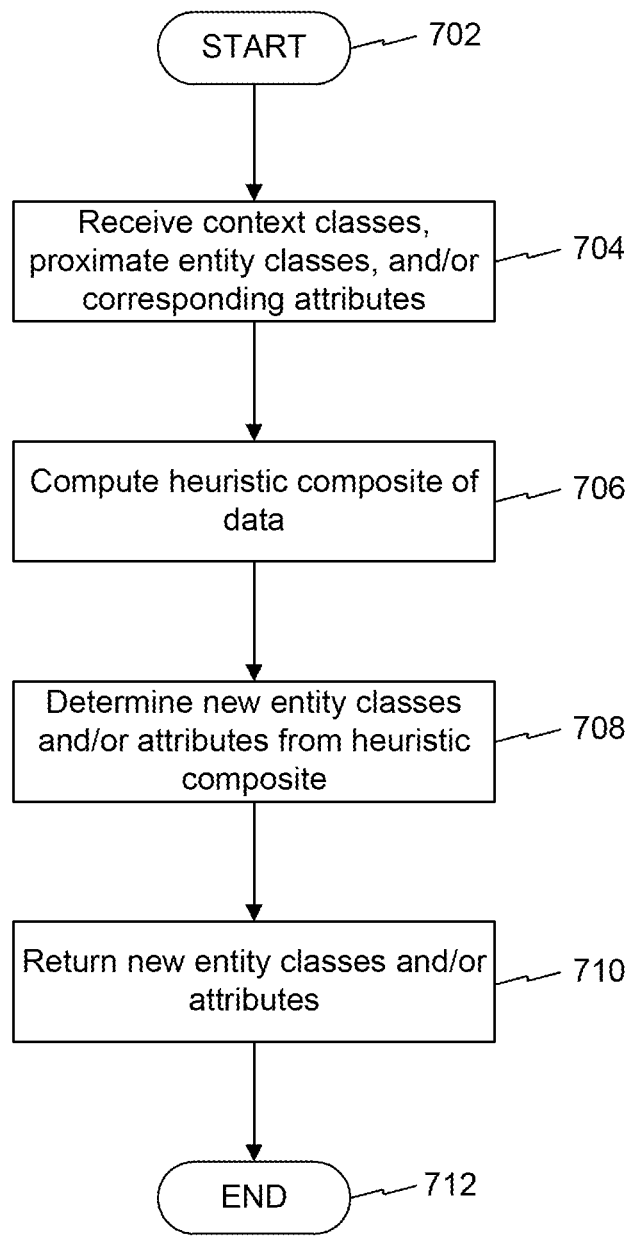
FIG. 7 is a flowchart of an example new entity class and attribute computation process consistent with the disclosed embodiments.

FIG. 7 is a flowchart of an example new entity class and attribute computation process 700, consistent with the disclosed embodiments. In some aspects, the embodiments described in connection with process 700 may be implemented via hardware and/or software on one or more of the components of system environment 100 such as server 110, client device 130, a computing device (e.g., computing device 1000) in communication with databases 140 and 150, or any combination thereof. The processes described in connection with FIG. 7 may occur as an independent process or as part of a broader scheme (e.g., the class assignment process 600). In some aspects, process 700 may identify and determine classes, attributes, attribute values, and their corresponding association scores for new entities on a quantitative basis. In some aspects, the embodiments disclosed in connection with FIG. 7 may improve the class, attribute, and association value computation by using quantitative parameters consistent with the disclosed embodiments.

As shown in FIG. 7, process 700 begins (step 702) by receiving one or more context classes associated with a particular prose section, one or more entity classes of known entities proximate to a new entity, and/or one or more of their corresponding attributes (step 704). The received information may also include data reflecting the corresponding association scores for any of these relationships. The disclosed embodiments may generate, receive, or provide this data using any process consistent with the disclosed embodiments, such as those described in connection with process 600 of FIG. 6.

Process 700 may determine the parameters for the new entity based on a heuristic composite of the received parameters (step 706). The heuristic composite may reflect a calculation of the degree of relatedness a new entity has to a parameter (e.g., a class, a subclass, attribute, association score, etc), based on similar parameters of an input. In certain aspects, for example, the heuristic composite represents the likelihood that a new entity is associated with a particular class, attribute, or attribute value based on the context classes of the surrounding context and the entities proximate to the new entity. In some embodiments, the heuristic composite may return values of a particular context and proximate entities that may not be evident when viewing each in isolation. In some embodiments, the heuristic composite may use the association scores of the input parameters to generate the association scores of the output parameters or determine whether an entity exhibits a particular attribute at all.

For example, the heuristic composite may determine the degree of relatedness a new entity has with another entity (e.g., a class or attribute) by performing an operation on two or more association scores (or sets of scores) associated with a context class or entity attribute. In certain aspects, such an operation may include a sum, average, weighted average, product, weighted product, regression, frequency of co-occurrence, cross-correlation, convolution, autocorrelation, or any other such mathematical or statistical operation. In certain embodiments, process 700 can compare values generated by the heuristic composite to predetermined thresholds to filter certain associations.

By way of illustration, consider the prose section "LeBron James received a pass of Joe Harris," wherein "Joe Harris" is a new entity. Using the processes disclosed herein, a system running process 700 may determine that "LeBron James" is a known entity and "received a pass from" is a context. Using a context model such as the one depicted in FIG. 2D, process 700 may determine that the context is associated with context classes including "person," "soccer player," and "basketball player," among others. Process 700 may also determine that the context is associated with these context classes having association scores of 0.97, 0.62, and 0.35, respectively. In addition, process 700 may determine that the proximate entity "LeBron James" is also associated with entity classes "person," "soccer player," and "basketball player" with respective association scores of 1.0, 0.01, and 0.98 (e.g., via attributes of "is a," "has profession" and "has profession," respectively). Process 700 may then compute a heuristic composite of these values to determine the likelihood that the new entity "Joe Harris" is associated with these classes. For example, by using a product operation as the heuristic composite operator, process 700 may determine that "Joe Harris" may be associated with the classes "person," "soccer player," and "basketball player" with respective association scores of 0.97, 0.01, and 0.34. Thus, while the context classes may have indicated a stronger relationship for "soccer player," the heuristic composite may provide a different result.

Process 700 may also use the heuristic composite to generate attributes for the new entity. For example, process 700 may determine that "LeBron James" is associated with an attribute "Cleveland Cavaliers" and that the class "basketball player" is associated with the attribute "team" (e.g., as indicated in an entity model). If the entity model relates "LeBron James" to "Cleveland Cavaliers" via an association score of 0.97, process 700 may use the foregoing calculations to determine an association score of 0.33 (=0.97*0.34) relating "Joe Harris" to "Cleveland Cavaliers."

As further shown in FIG. 7, process 700 may then determine the classes, attributes, and corresponding association scores for the new entity (step 708). In some embodiments, this determination may reflect the results of the prior computation. In other aspects, process 700 may compare the association scores generated from the heuristic composite and compare those values to a predetermined threshold. In some aspects, process 700 may reject or reduce to 0.0 any relationship having an association score below a threshold (e.g., 0.05, 0.10, 0.20, etc.).

Process 700 may then return the accepted classes, attributes, and association scores for the new entity (step 710). This information may be provided to other processes to conduct for analysis consistent with the disclosed embodiments (step 712). In one example, for instance, process 700 may provide the results to a system running process 600 in order to assign and store the generated relationships in an existing entity model.

Figure 8:
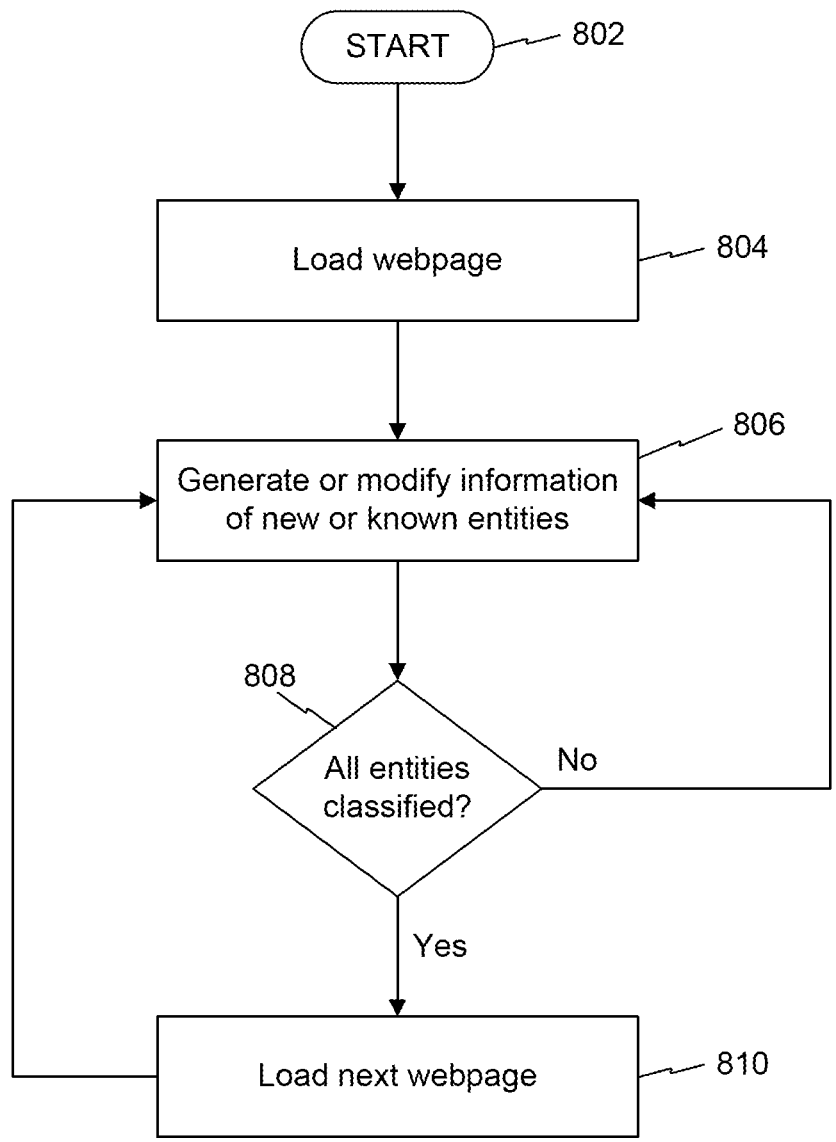
FIG. 8 is a flowchart of an example entity class and attribute assignment process over several webpages consistent with the disclosed embodiments.

The disclosed embodiments may be implemented on any type of network documents containing entities, such as a webpage, Internet document, or any other type of text data available over a network (e.g., network 120). The disclosed embodiments may iterate over any number of such documents to discover new entities and generate their properties. For example, FIG. 8 is a flowchart of an example entity class and attribute assignment process 800 over several webpages, consistent with the disclosed embodiments. In some aspects, the embodiments described in connection with process 800 may be implemented via hardware and/or software on one or more of the components of system environment 100 such as server 110, client device 130, a computing device (e.g., computing device 1000) in communication with databases 140 and 150, or any combination thereof. Process 800 and the embodiments therein may occur as a standalone process or as part of a broader processing scheme.

As illustrated in FIG. 8, process 800 begins (step 802) by loading a webpage or other type of network document (step 804). Process 800 may parse the loaded document in any manner consistent with the disclosed embodiments, such as those discussed in connection with FIG. 4. Process 800 may also identify and generate the classes, attributes, and association values for new entities as disclosed herein (step 806). In some embodiments, process 800 may also update the entity models and/or the context models based on its analysis. Process 800 may update existing data models using any process consistent with the disclosed embodiments (see, e.g., the embodiment discussed in connection with FIG. 9). While process 800 detects that new or existing entities must be created or modified (step 808), the process of generating and updating the information for the new and existing may continue consistent with the disclosed embodiments (step 806). In some aspects, process 800 may determine that all of the entities (new and/or existing) have been identified and updated based on, for example, completing the final prose section of the loaded document. In certain embodiments, process 800 may then crawl to a second webpage or document, load it, and begin the process anew (step 810).

Figure 9:
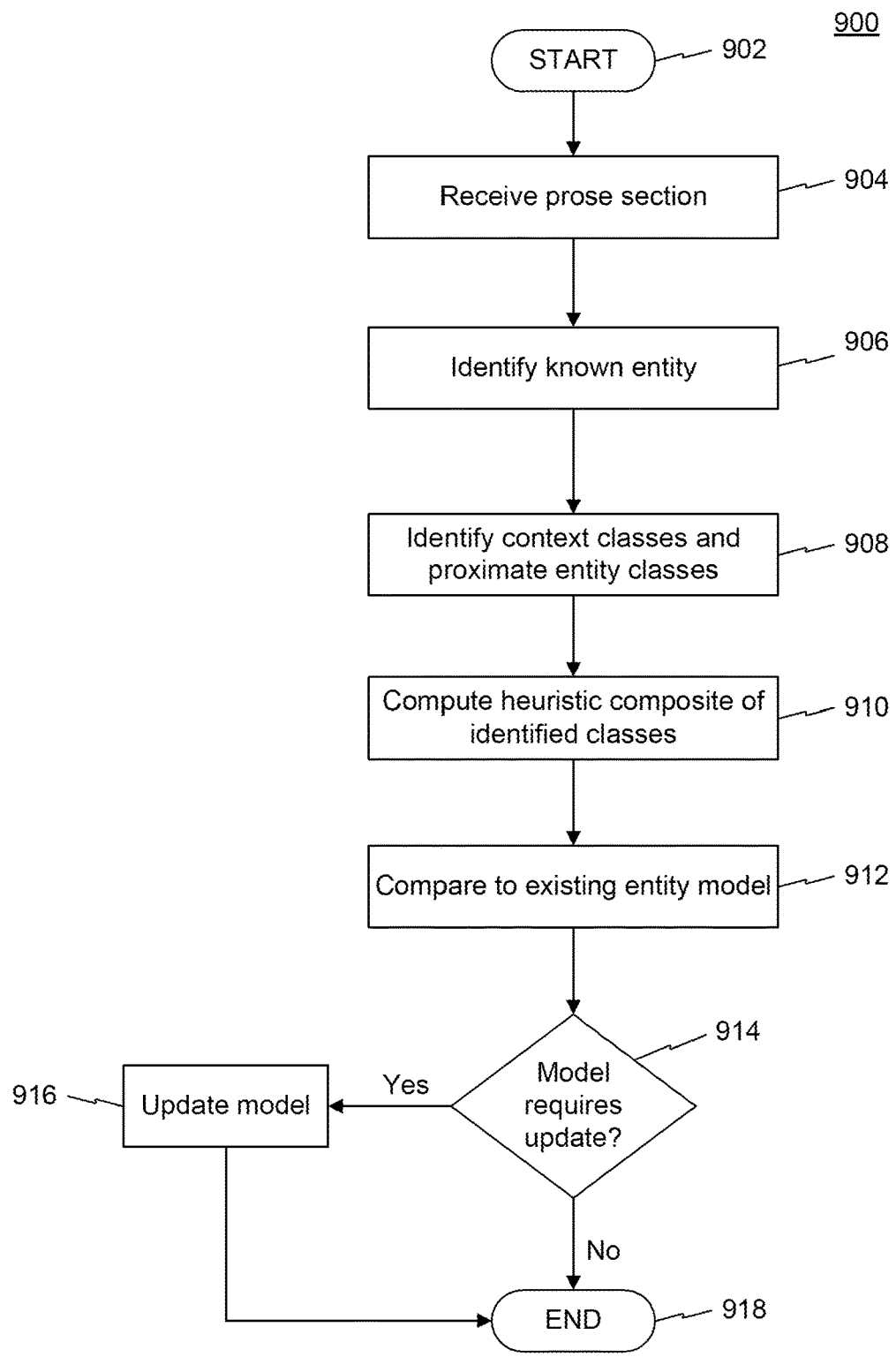
FIG. 9 is a flowchart of an example class and attribute modification process consistent with the disclosed embodiments.

FIG. 9 is a flowchart of an example class and attribute modification process 900, consistent with the disclosed embodiments. In certain embodiments, processes consistent with process 900 may modify or update existing entity or context models, and in particular, the association scores contained therein. In some aspects, the embodiments described in connection with process 900 may be implemented via hardware and/or software on one or more of the components of system environment 100 such as server 110, client device 130, a computing device (e.g., computing device 1000) in communication with databases 140 and 150, or any combination thereof. Process 900 and the embodiments therein may occur as a standalone process or as part of a broader processing scheme (e.g., as described in connection with FIG. 4).

As illustrated in FIG. 9, process 900 starts (step 902) by receiving a prose section containing one or more words (step 904). The prose section may include one or more known entities within it along with one or more contexts. Process 900 may identify a known entity with the section and select it for modification (step 906).

Process 900 may undertake a process similar to that of classifying new entities consistent with FIGS. 4-7, with appropriate modifications as described below. For example, process 900 may identify the context classes of the proximate context(s) of the known entity, the classes and attributes of the (other) proximate known entities, and the corresponding association scores of each of these items (step 910). In some embodiments, process 900 may compute the heuristic composite of all of the context classes, entity classes, attributes, and association scores associated with the identified parameters (step 912).

Process 900 may compare the generated values and relationships for the known entity to those already identified and established by, for example, one or more entity models (e.g., a knowledge graph) (step 914). Based on this comparison, process 900 may determine whether to update the entity model (step 916). In some embodiments, updating the entity model may constitute an automatic process (step 920). Process 900 may assess whether to update the entity model based on one or more update conditions. In some aspects, an update condition may represent any state of facts under which process 900 will update an existing model. An update condition may exist, for example, when the heuristic composite indicates the presence of a new class or attribute association for the new entity, when the new association has an association value exceeding a minimum threshold, when the heuristic composite results in a change to the current association scores for the known entity, and so on.

By way of example, process 900 may analyze a prose section such as "Joe Harris scored on an alley-oop from Kyrie Irving." Process 900 may scan this section to determine that "Joe Harris" and "Kyrie Irving" are known entities, separated by the context "scored on an alley-oop from." Process 900 may then determine that the context classes associated with the context may include "basketball player." Process 900 may also determines that "Kyrie Irving" is an entity associated with the class "basketball player." Based on these determinations, the heuristic composite may return an association score relating "Joe Harris" to "basketball player" of, for example, 0.80. In some aspects, process 900 may incorporate this value into the existing association score relating these items (0.34, as illustrated in connection with FIG. 7). This incorporation may take the form of a sum, average, weighted average, convolution, or any other suitable operation enumerated above. For example, process 900 may average the two association values to determine that the new association score linking "Joe Harris" and the class "basketball player" should be, for instance, 0.57. In addition, process 900 may also weight the current value by the number of calculations from which is stems, a frequency of co-occurrence between the data items, the recency of the calculations (e.g., weight recent calculations more heavily), and so on. In some aspects, these considerations may also be incorporated into the heuristic composite calculation itself. In some embodiments, process 900 may update a context model using the same procedures described herein.

When process 900 determines that an update condition exists, the process may update the entity or context model accordingly (step 916). If not, process 900 may end the current routine and continue to conduct processing consistent with the disclosed embodiments, such as continuing to update and modify models as disclosed in FIG. 8 (step 918).

Those of ordinary skill in the art will appreciate that the processes discussed in connection with FIGS. 4-9 may be rearranged, reordered, combined, skipped, or modified without departing from the nature of the disclosed embodiments. Moreover, all of the foregoing steps are optional. Furthermore, as discussed above, the foregoing processes may be implemented on any single or combination of computing systems such as server 110, client device 130, or other computing system in communication with databases 140 and 150.

Figure 10:
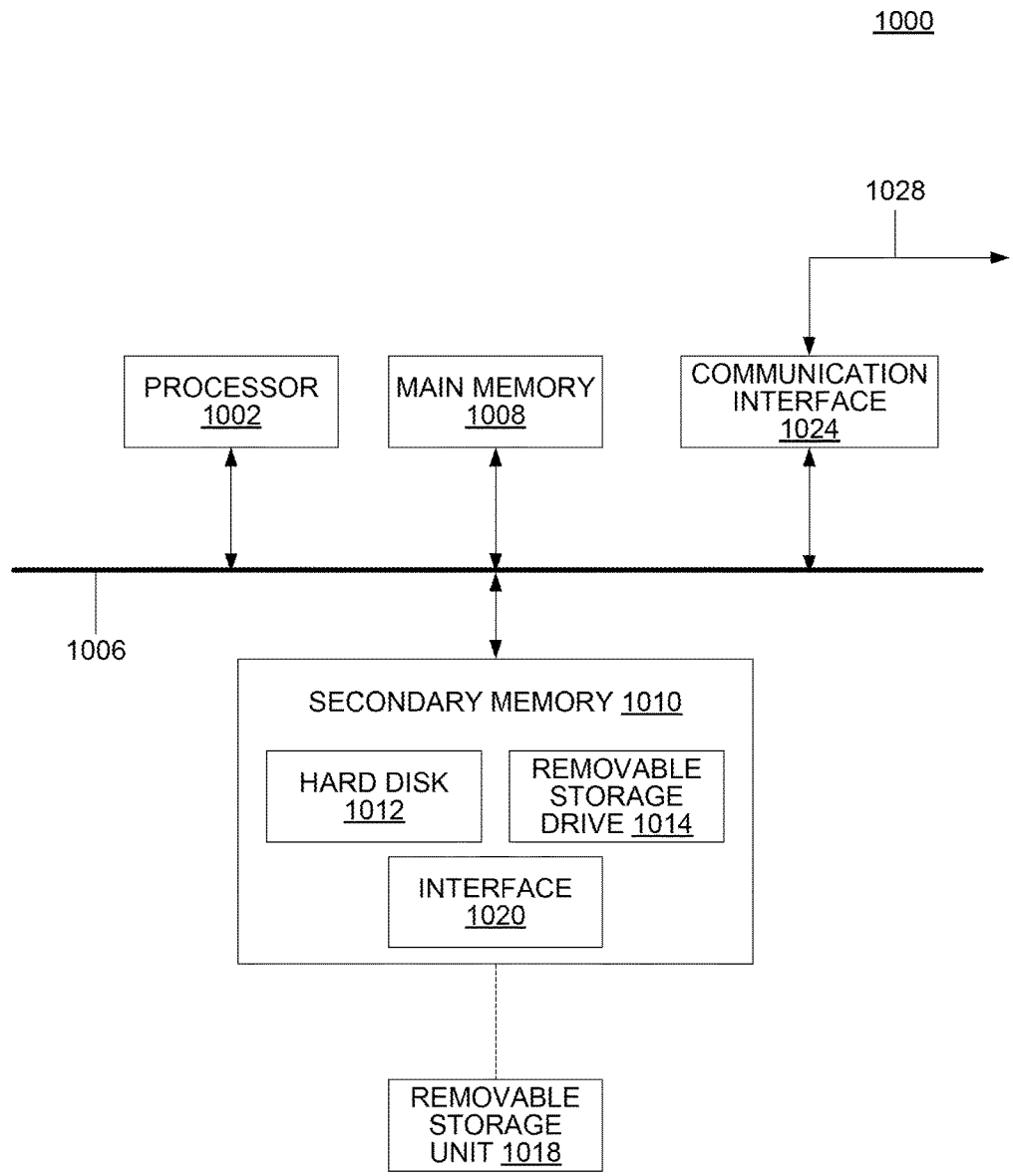
FIG. 10 depicts an example computing system for implementing processes consistent with the disclosed embodiments.

FIG. 10 depicts a block diagram of an example computer system 1000 with which certain aspects, consistent with the disclosed embodiments, may be implemented. For example, in some aspects, computer system 1000 may reflect computer systems associated with a device (e.g., a client device, database, and/or server of FIG. 1) performing one or more of the processes disclosed herein. In some embodiments, computer system 1000 may include one or more processors 1002 connected to a communications backbone 1006 such as a bus or external communications network (e.g., any medium of digital data communication such as a LAN, MAN, WAN, cellular network, WiFi network, NFC link, Bluetooth, GSM network, PCS network, I/O connection, any wired connection such as USB, and any associated protocols such as HTTP, TCP/IP, RFID, etc).

In certain aspects, computer system 1000 may include main memory 1008. Main memory 1008 may comprise random access memory (RAM) representing a tangible and non-transitory computer-readable medium storing computer programs, sets of instructions, code, or data executed with processor 1002. When executed by processor 1002, such instructions, computer programs, etc, enable processor 1002 to perform one or more processes or functions consistent with the disclosed embodiments. In some aspects, such instructions may include machine code (e.g., from a compiler) and/or files containing code that processor 1002 may execute with an interpreter.

In some aspects, main memory 1008 may also include or connect to a secondary memory 1010. Secondary memory 1010 may include a disk drive 1012 (e.g., HDD, SSD), and/or a removable storage drive 1014, such as a magnetic tape drive, flash memory, an optical disk drive, CD/DVD drive, or the like. The removable storage drive 1014 may read from and/or write to a removable storage unit 1018 in a manner known to the skilled artisan. Removable storage unit 1018 may represent a magnetic tape, optical disk, or other storage medium that is read by and written to by removable storage drive 1014. Removable storage unit 1018 may represent a tangible and non-transitory computer-readable medium having stored therein computer programs, sets of instructions, code, or data to be executed by processor 1002.

In other embodiments, secondary memory 1010 may include other means for allowing computer programs or other program instructions to be loaded into computer system 1000. Such means may include, for example, another removable storage unit 1018 or an interface 1020. An example of such means may include a removable memory chip (e.g., EPROM, RAM, ROM, DRAM, EEPROM, flash memory devices, or other volatile or nonvolatile memory devices) and associated socket, or other removable storage units 1018 and interfaces 1020, which allow instructions and data to be transferred from the removable storage unit 1018 to computer system 1000.

Computer system 1000 may also include one or more communications interfaces 1024. Communications interface 1024 may allow software and data to be transferred between computer system 1000 and external systems (e.g., in addition to backbone 1006). Communications interface 1024 may include a modem, a network interface (e.g., an Ethernet card), a communications port, a PCMCIA slot and card, etc. Communications interface 1024 may transfer software and data in the form of signals, which may be electronic, electromagnetic, optical or other signals capable of being received by communications interface 1024. These signals may be provided to communications interface 1024 via a communications path (i.e., channel 1028). Channel 1028 may carry signals and may be implemented using wire, cable, fiber optics, RF link, and/or other communications channels. In one embodiment, the signals comprise data packets sent to processor 1002. Information representing processed packets may also be sent in the form of signals from processor 1002 through communications path 1028.

In certain aspects, the computer-implemented methods described herein can be implemented on a single processor of a computer system, such as processor 1002 of computer system 1000. In other embodiments, these computer-implemented methods may be implemented using one or more processors within a single computer system and/or on one or more processors within separate computer systems in communication over a network.

In certain embodiments in connection with FIG. 10, the terms "storage device" and "storage medium" may refer to particular devices including, but not limited to, main memory 1008, secondary memory 1010, a hard disk installed in hard disk drive 1012, and removable storage unit 1018. Further, the term "computer-readable medium" may refer to devices including, but not limited to, a hard disk installed in hard disk drive 1012, any combination of main memory 1008 and secondary memory 1010, and removable storage unit 1018, which may respectively provide computer programs and/or sets of instructions to processor 1002 of computer system 1000. Such computer programs and sets of instructions can be stored within one or more computer-readable media. In certain aspects, computer programs and sets of instructions may also be received via communications interface 1024 and stored on the one or more computer-readable media.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a device system or existing communications software.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods, which fall within the true spirit and scope of the disclosure. As used herein, the indefinite articles "a" and "an" mean "one or more" in open-minded claims containing the transitional phrase "comprising," "including," and/or "having." Similarly, words such as "and" or "or" mean "and/or" unless specifically directed otherwise. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments will be apparent to those skilled in the art from consideration of the specification and practice of the embodiments disclosed herein. It is intended that the specification and examples be considered as example only, with a true scope and spirit of the disclosed embodiments being indicated by the following claims.

What is claimed:

1. A system for extracting and storing information regarding entities, the system comprising:
    a memory storing a set of instructions; and
    one or more processors configured to execute the set of instructions to perform one or more operations, the operations comprising:
        detecting a given n-gram in a document accessible over a network;
        determining that the given n-gram corresponds to a new entity based on one or more entity models stored in a database,
            wherein determining that the given n-gram corresponds to the new entity comprises determining that the given n-gram is absent from the one or more entity models stored in the database;
        detecting a known entity, wherein the known entity is contained in the one or more entity models, and wherein the known entity is associated, in the one or more entity models, with a known n-gram for the known entity,
            wherein detecting the known entity is based on the known n-gram, for the known entity, being positionally proximate, within prose in the document, to the given n-gram that corresponds to the new entity;
        detecting a context, wherein the context has a lexical relationship to the known entity, and wherein a context n-gram is defined for the context,
            wherein detecting the context is based on the context n-gram, defined for the context, being positionally proximate, within the prose in the document, to:
                the given n-gram that corresponds to the new entity, and
                the known n-gram for the known entity;
        determining a second entity class associated with the known entity and a context class associated with the context;
        generating a first entity class associated with the new entity based on the second entity class and the context class;
        generating, in the database, a first entry in at least one of the one or more entity models, generating the first entry comprising storing new information in the database, wherein the new information describes the new entity and the association between the first entity class and the new entity, and wherein generating the first entry and the new information maintain the database up-to-date to provide current search results to search queries; and
        providing access to the one or more entity models to a search engine to facilitate the processing of search queries, wherein providing access to the one or more entity models to facilitate the processing of search queries comprises providing access to the generated first entry to enable the search engine to receive a search query transmitted over a network from a client device, generate a search result based on the generated first entry, and transmit the search result to the client device for presentation.

2. The system of claim 1, wherein the system further comprises the search engine, and wherein the search engine is configured to perform search engine operations comprising:
    receiving, by the search engine, the search query transmitted over the network from the client device;
    generating, by the search engine, the search result based on the generated first entry; and
    transmitting, by the search engine, the search result to the client device for presentation.

3. The system of claim 1, wherein the first entity class is based on:
    a second association score reflecting a degree of relatedness between the known entity and the second entity class; and
    a third association score reflecting a degree of relatedness between the context and the context class.

4. The system of claim 3, wherein the first entity class is further based on a heuristic composite of the second association score and the third association score, the heuristic composite comprising one of the following operations: an average, a weighted average, or a product.

5. The system of claim 4, wherein the operations further comprise generating a first association score based on the second association score and the third association score, the first association score reflecting a degree of relatedness between the new entity and the first entity class.

6. The system of claim 5, wherein the first association score is equal to the heuristic composite.

7. The system of claim 1, wherein the operations further comprise:
    detecting another known entity positionally proximate to the new entity, wherein the another known entity is contained in the one or more entity models;

identifying a third entity class associated with the another known entity based on the one or more entity models; and
updating the first entity class based on the third entity class.

8. The system of claim of claim 7, wherein the detecting the another known entity occurs on another document that is different from the document.

9. The system of claim 1, wherein the operations further comprise:
determining a first superclass associated with the first entity class based on the second entity class and the context class, wherein the first entity class represents a subclass of the first superclass; and
updating the first entry to include the association between the first entity class and the first superclass.

10. The system of claim 9, wherein updating the first entry to include the association between the first entity class and the first superclass further comprises assigning all of the entity attributes associated with the first superclass to the first entity class.

11. A computer-implemented method for extracting and storing information regarding entities, the method comprising the following operations performed on one or more processors:
detecting a given n-gram in a document accessible over a network;
determining that the given n-gram corresponds to a new entity based on one or more entity models stored in a database,
wherein determining that the given n-gram corresponds to the new entity comprises determining that the given n-gram is absent from the one or more entity models stored in the database;
detecting a known entity, wherein the known entity is contained in the one or more entity models, and wherein the known entity is associated, in the one or more entity models, with a known n-gram for the known entity,
wherein detecting the known entity is based on the known n-gram, for the known entity being positionally proximate, within prose in the document, to the given n-gram that corresponds to the new entity
detecting a context, wherein the context has a lexical relationship to the known entity, and wherein a context n-gram is defined for the context,
wherein detecting the context is based on the context n-gram defined for the context, being positionally proximate, within the prose in the document, to:
the given n-gram that corresponds to the new entity, and
the known n-gram for the known entity;
determining a second entity class associated with the known entity and a context class associated with the context;
generating a first entity class associated with the new entity based on the second entity class and the context class;
generating, in the database, a first entry in at least one of the one or more entity models, generating the first entry comprising storing new information in the database, wherein the new information describes the new entity and the association between the first entity class and the new entity, and wherein generating the first entry and the new information maintain the database up-to-date to provide current search results to search queries;

providing access to the one or more entity models to a search engine to facilitate the processing of search queries;
receiving, by the search engine, a search query transmitted over a network from a client device;
generating, by the search engine, a search result based on the first entry; and
transmitting, by the search engine, the search result to the client device for presentation.

12. The computer-implemented method of claim 11, wherein the first entity class is based on:
a second association score reflecting a degree of relatedness between the known entity and the second entity class; and
a third association score reflecting a degree of relatedness between the context and the context class.

13. The computer-implemented method of claim 12, wherein the first entity class is further based on a heuristic composite of the second association score and the third association score, the heuristic composite comprising one of the following operations: an average, a weighted average, or a product.

14. The computer-implemented method of claim 13, further comprising generating a first association score based on the second association score and the third association score, the first association score reflecting a degree of relatedness between the new entity and the first entity class.

15. The computer-implemented method of claim 14, wherein the first association score is equal to the heuristic composite.

16. The computer-implemented method of claim 11, further comprising:
detecting another known entity positionally proximate to the new entity, wherein the another known entity is contained in the one or more entity models;
identifying a third entity class associated with the another known entity based on the one or more entity models; and
updating the first entity class based on the third entity class.

17. The computer-implemented method of claim 11, further comprising:
determining a first superclass associated with the first entity class based on the second entity class and the context class, wherein the first entity class represents a subclass of the first superclass; and
updating first entry to include the association between the first entity class and the first superclass.

18. A tangible, non-transitory computer-readable medium storing instructions, that, when executed by at least one processor, cause the at least one processor to perform a method for extracting and storing information regarding entities, comprising:
detecting a given n-gram in a document accessible over a network;
determining that the given n-gram corresponds to a new entity based on one or more entity models stored in a database,
wherein determining that the given n-gram corresponds to the new entity comprises determining that the given n-gram is absent from the one or more entity models stored in the database;
detecting a known entity, wherein the known entity is contained in the one or more entity models, and wherein the known entity is associated, in the one or more entity models, with a known n-gram for the known entity, wherein detecting the known entity is based on the known n-gram, for the known entity, being positionally proximate, within prose in the document, to the given n-gram that corresponds to the new entity;

detecting a context, wherein the context has a lexical relationship to the known entity, and wherein a context n-gram is defined for the context, wherein detecting the context is based on the context n-gram, defined for the context, being positionally proximate, within the prose in the document, to:
the given n-gram that corresponds to the new entity, and
the known n-gram for the known entity;

determining a second entity class associated with the known entity and a context class associated with the context;

generating a first entity class associated with the new entity based on the second entity class and the context class;

generating, in the database, a first entry in at least one of the one or more entity models, generating the first entry comprising storing new information in the database, wherein the new information describes the new entity and the association between the first entity class and the new entity, and wherein generating the first entry and the new information maintain the database up-to-date to provide current search results to search queries; and providing access to the one or more entity models to a search engine to facilitate the processing of search queries.

* * * * *